(12) United States Patent
Nagai et al.

(10) Patent No.: US 9,653,725 B2
(45) Date of Patent: May 16, 2017

(54) LITHIUM RECHARGEABLE BATTERY

(75) Inventors: Hiroki Nagai, Nagoya (JP); Yutaka Oyama, Toyota (JP)

(73) Assignee: Toyota Jidosha Kabushiki Kaisha, Toyota-shi, Aichi (JP)

( * ) Notice: Subject to any disclaimer, the term of this patent is extended or adjusted under 35 U.S.C. 154(b) by 282 days.

(21) Appl. No.: 14/241,190

(22) PCT Filed: Aug. 2, 2012

(86) PCT No.: PCT/JP2012/069756
§ 371 (c)(1),
(2), (4) Date: Feb. 26, 2014

(87) PCT Pub. No.: WO2013/031478
PCT Pub. Date: Mar. 7, 2013

(65) Prior Publication Data
US 2014/0205901 A1    Jul. 24, 2014

(30) Foreign Application Priority Data

Aug. 31, 2011 (JP) ................................. 2011-189422

(51) Int. Cl.
*H01M 4/36* (2006.01)
*C01G 53/00* (2006.01)
(Continued)

(52) U.S. Cl.
CPC ............ *H01M 4/36* (2013.01); *C01G 53/006* (2013.01); *C01G 53/50* (2013.01); *H01M 4/13* (2013.01);
(Continued)

(58) Field of Classification Search
None
See application file for complete search history.

(56) References Cited

U.S. PATENT DOCUMENTS 5,702,845 A    12/1997  Kawakami et al.
2008/0268347 A1*  10/2008  Ohzuku ................ H01M 4/505
                                                        429/322
(Continued)

FOREIGN PATENT DOCUMENTS

JP    8-321300    12/1996
JP    2000-195514    7/2000
(Continued)

*Primary Examiner* — Scott J Chmielecki
(74) *Attorney, Agent, or Firm* — Finnegan, Henderson, Farabow, Garrett & Dunner, LLP

(57) ABSTRACT

The lithium rechargeable battery of the present invention is provided with a current collector and an active material layer containing active material particles 10 supported on this current collector. The active material particles 10 are secondary particles 14 in which a plurality of primary particles 12 of a lithium transition metal oxide are aggregated, and have a hollow structure that contains a hollow section 16 formed inside the secondary particle 14 and a shell section 15 that surrounds the hollow section 16. A through hole 18 that penetrates from the outside to the hollow section 16 is formed in the secondary particle 14. The ratio (A/B) in a powder x-ray diffraction pattern of the active material particles 10, where A is the full width at half maximum of the diffraction peak obtained for the (003) plane and B is the full width at half maximum of the diffraction peak obtained for the (104) plane, satisfies the equation $(A/B) \leq 0.7$.

8 Claims, 11 Drawing Sheets

(51) Int. Cl.
  *H01M 4/13* (2010.01)
  *H01M 4/131* (2010.01)
  *H01M 4/525* (2010.01)
  *H01M 10/052* (2010.01)
  *H01M 4/02* (2006.01)

(52) U.S. Cl.
  CPC ........... *H01M 4/131* (2013.01); *H01M 4/364* (2013.01); *H01M 4/366* (2013.01); *H01M 4/525* (2013.01); *H01M 10/052* (2013.01); *C01P 2002/50* (2013.01); *C01P 2004/03* (2013.01); *C01P 2004/62* (2013.01); *H01M 2004/021* (2013.01); *Y02P 70/54* (2015.11); *Y02T 10/7011* (2013.01)

(56) References Cited

U.S. PATENT DOCUMENTS

| | | | | |
|---|---|---|---|---|
| 2009/0023070 A1* | 1/2009 | Tokita | .................... | C01G 31/00 429/231.5 |
| 2010/0119945 A1* | 5/2010 | Akagi | .................... | H01M 4/131 429/231.8 |
| 2010/0330423 A1* | 12/2010 | Cui | .................... | H01M 4/38 429/220 |
| 2012/0270106 A1* | 10/2012 | Todorov | .................... | C01G 53/42 429/223 |
| 2012/0282525 A1* | 11/2012 | Nagai | .................... | H01M 4/505 429/223 |
| 2012/0305392 A1* | 12/2012 | Kim | .................... | C04B 35/01 204/298.13 |
| 2013/0146808 A1* | 6/2013 | Endo | .................... | H01M 4/505 252/182.1 |

FOREIGN PATENT DOCUMENTS

| | | | | |
|---|---|---|---|---|
| JP | 2011-119092 | 6/2011 | | |
| WO | WO 2011/067982 A1 | 6/2011 | | |
| WO | WO 2011065408 A1 * | 6/2011 | ............. | C01G 53/42 |
| WO | WO 2011067982 A1 * | 6/2011 | ............. | H01M 4/505 |

* cited by examiner

LITHIUM RECHARGEABLE BATTERY

TECHNICAL FIELD

The present invention relates to a lithium rechargeable battery. More particularly, the present invention relates to a lithium rechargeable battery that contains active material particles formed of a lithium transition metal oxide.

This application is a national phase application of International Application No. PCT/JP2012/069756, filed Aug. 2, 2012, and claims priority based on Japanese Patent Application No. 2011-189422 filed on 31 Aug. 2011, and the contents of those applications are incorporated in their entirety in this Description by reference.

BACKGROUND ART

Lithium ion batteries, nickel hydride batteries, and other rechargeable batteries have become increasingly important in recent years as vehicular power sources and as power sources for personal computers and mobile and portable electronic devices. In particular, the lithium rechargeable battery, which provides a high energy density at a low weight, is preferentially used as a high-output power source for installation in vehicles. In a lithium rechargeable battery, materials (the active material) capable of reversibly incorporating and discharging the lithium ion (Li ion) are provided at the positive and negative electrodes and charging and discharge are performed by the shuttling of the Li ion between the positive and negative electrodes. Lithium transition metal oxides that contain lithium and a transition metal element are a typical example of the active material (positive electrode active material) used in the positive electrode of such lithium rechargeable batteries. For example, the use is preferred of a lithium transition metal oxide that contains at least nickel (Ni) as the transition metal element (a nickel-containing lithium transition metal oxide) and that has a layered crystal structure. Patent Literature 1 is provided as technical literature related to the active material in lithium rechargeable batteries.

CITATION LIST

Patent Literature

Patent Literature 1: Japanese Patent Application Publication No. H08-321300

SUMMARY OF INVENTION

Vehicles that can be driven by an electric motor, such as so-called hybrid vehicles and electric automobiles, can be driven by only the power stored in the battery. The output of this battery tends to decline as the state of charge (SOC) declines. It is desirable, in order to achieve a stable operation, to use a battery within a prescribed SOC range. The operating performance of, e.g., a hybrid vehicle or electric automobile, could be improved if the battery mounted in such a vehicle could also exhibit the required output in a region of low SOC. In addition, the number of batteries necessary to secure the required amount of energy could be reduced—and a cost reduction could then be pursued—if the required output could also be generated in a region of low SOC.

The lithium rechargeable battery according to the present invention includes a current collector and an active material layer that contains active material particles that are retained on the current collector. These active material particles are secondary particles formed by the aggregation of a plurality of primary particles of a lithium transition metal oxide and are constituted of a hollow structure having a hollow section formed within the secondary particle and a shell section that surrounds the hollow section. A through hole that penetrates from the outside to the hollow section is formed in these secondary particle. The ratio (A/B) in the powder x-ray diffraction (x-ray diffraction using the CuK$\alpha$ line) pattern of the active material particles—where A is the full width at half maximum of the diffraction peak obtained for the (003) plane and B is the full width at half maximum of the diffraction peak obtained for the (104) plane—satisfies the equation (A/B)≤0.7.

Lithium transition metal oxides, e.g., $LiNiO_2$ and so forth, generally have layered structures generated by the repetitive stacking of an Li layer, O layer, transition metal layer, and O layer, and the Li ion undergoes incorporation and release from the direction orthogonal to the direction (c axis) in which these layers are stacked. When the crystal is excessively thick in the direction orthogonal to this c axis, a long diffusion distance then occurs for the Li ion and diffusion of the ion into the interior of the crystal becomes slow. Moreover, when a plurality of primary particles comprising this crystal undergoes aggregation to form a secondary particle, diffusion of the Li ion is impeded due to the presence of grain boundaries within this particle. This reduction in the Li ion diffusivity can cause a decline in battery performance (for example, a decline in the output characteristics). In particular, the Li ion assumes a high concentration within the active material in the low SOC region and ion diffusion into the interior of the active material during discharge then becomes rate-limiting and the aforementioned performance deterioration can be readily induced as a result.

Because, in accordance with the present invention, the ratio (A/B) in the powder x-ray diffraction pattern of the active material particles—where A is the full width at half maximum of the diffraction peak obtained for the (003) plane and B is the full width at half maximum of the diffraction peak obtained for the (104) plane—is less than or equal to 0.7, the thickness in the direction orthogonal to the c axis of the crystal is much smaller than for conventional active material particles in which this full width at half maximum ratio (A/B) exceeds 0.7. The diffusion distance for the Li ion is short as a result and diffusion of the Li ion into the interior of the crystal is then rapid. Moreover, because a hollow section is formed within the secondary particle that is itself provided by the aggregation of a plurality of primary particles comprising such crystals, there is less aggregation of the primary particles than in the compact structure of a solid. As a consequence, there are few grain boundaries within the particle and Li ion diffusion into the particle is then even faster. As a consequence, a lithium rechargeable battery fabricated using these active material particles can stably exhibit a high output even in the low SOC region (for example, an SOC of 30% or less).

The full width at half maximum ratio (A/B) satisfies (A/B)≤0.7 in a preferred aspect of the herein disclosed art. (A/B)≤0.65 is preferred and (A/B)≤0.6 is more preferred. When the full width at half maximum ratio (A/B) is too large, the thickness in the direction orthogonal to the c axis of the crystal becomes large and diffusion of the ion into the interior of the crystal is then slow and the required output characteristics may not be obtained as a result. On the other hand, active material particles for which the full width at half maximum ratio (A/B) is too small, in addition to being difficult to produce (synthesize), exhibit inadequate crystal growth (particularly growth in the direction orthogonal to the c axis), and as a consequence the metal may elute into the electrolyte solution during storage at high temperatures. Metal elution into the electrolyte solution can cause the battery capacity to decline. Viewed from the standpoint of preventing the capacity from deteriorating during high-temperature storage, 0.45≤(A/B) is favorable, but 0.5≤(A/B) is preferred.

The average thickness, in the active material particle, of the shell section that surrounds the hollow section is not more than 2.2 µm in a preferred aspect of the herein disclosed lithium rechargeable battery. Such a construction results in a very thin shell section surrounding the hollow section in the active material particle. As a consequence, the Li ion rapidly diffuses into the interior of the shell section of the active material particle and the effects noted above can then be even more favorably manifested. The lower limit on the average thickness of the shell section is not particularly limited, but is favorably approximately at least 0.1 µm. The durability required of the active material particle is secured and the lithium rechargeable battery performance is stabilized by having the average thickness of the shell section be at least 0.1 µm.

In a preferred aspect of the herein disclosed lithium rechargeable battery, the lithium transition metal oxide is a compound with a layered crystal structure that contains at least nickel as a structural element. This lithium transition metal oxide may be, for example, a compound with a layered crystal structure that contains nickel, cobalt, and manganese as structural elements. The lithium transition metal oxide may also be a compound with a layered crystal structure that contains tungsten. In this case, the content of this tungsten is desirably 0.05 mol % to 1 mol % where the total of all the non-tungsten transition metal elements in the compound is 100 mol % as the mole percentage. The full width at half maximum ratio (A/B) referenced above can be suitably controlled into the herein disclosed preferred range when the tungsten content is this tungsten content.

The lithium transition metal oxide under consideration preferably is a compound with a layered crystal structure that is represented by the following general formula.

$$Li_{1+x}Ni_yCo_zMn_{(1-y-z)}W_\alpha M_\beta O_2 \quad (1)$$

In formula (1), the value of x is 0≤x≤0.2; the value of y is 0.1<y<0.9; the value of z is 0.1<z<0.4; the value of α is 0.0005≤α≤0.01; and the value of β is 0≤β≤0.01. M is a dopant element in this formula and is either not present or is one or two or more elements from Zr, Mg, Ca, Na, Fe, Cr, Zn, Si, Sn, Al, B, and F. In particular, x in this formula preferably is a real number that satisfies 0.05≤x≤0.2. In addition, α in this formula is particularly preferably a real number satisfying 0.001≤α≤0.01 (more preferably 0.002≤α≤0.01 and even more preferably 0.005≤α≤0.01).

The present invention also provides a favorable method for producing the active material particles that have been described in the preceding. Thus, the production method of the present invention is a method that produces active material particles that are secondary particles provided by the aggregation of a plurality of primary particles of a lithium transition metal oxide and that have a perforated hollow structure having a hollow section formed within the secondary particle and a shell section that surrounds the hollow section, wherein a through hole that penetrates from the outside to the hollow section is formed in the secondary particles.

Specifically, the herein disclosed method of producing active material particles includes a step (the starting hydrox-ide preparation step) of supplying an ammonium ion to an aqueous solution (specifically a water-based solution) of a transition metal compound to precipitate particles of a transition metal hydroxide from the aqueous solution. This aqueous solution contains at least one transition metal element that is a constituent of the lithium transition metal oxide. This production method also includes a step (the mixing step) of preparing a prefiring mixture that contains the aforementioned transition metal hydroxide and a lithium compound, wherein this preparation is carried out at a lithium excess whereby the molar ratio (Li/$M_{all}$) between the lithium (Li) and the sum ($M_{all}$) of all the other structural metal elements is in the range from 1.05 to 1.2 (from at least 1.05 to not more than 1.2). Also included is a step (the firing step) that provides the active material particles by firing the mixture with the maximum firing temperature being set within the range from 700° C. to 1000° C. This production method makes possible the favorable production of active material particles in which the ratio (A/B) in the powder x-ray diffraction pattern of the active material particles, where A is the full width at half maximum of the diffraction peak obtained for the (003) plane and B is the full width at half maximum of the diffraction peak obtained for the (104) plane, satisfies the equation (A/B)≤0.7. This production method can be advantageously used, for example, as a method of producing any of the herein disclosed active material particles.

The firing step is preferably carried out for a firing time of 3 to 20 hours with the maximum firing temperature being 850° C. to 950° C. This makes it possible to more easily produce the active material particles having a perforated hollow structure and satisfying 0.45≤(A/B)≤0.7 for the aforementioned full width at half maximum ratio (A/B).

The transition metal hydroxide referenced above may contains tungsten. In this case, the content of this tungsten is preferably 0.05 mol % to 1 mol % where the total of all the non-tungsten transition metal elements in the transition metal hydroxide is 100 mol % as the mole percentage. This makes it possible to more easily produce the active material particles having a perforated hollow structure and satisfying (A/B)≤0.7 for the aforementioned full width at half maximum ratio (A/B).

The starting hydroxide preparation step preferably includes a nucleus production stage in which the transition metal hydroxide is precipitated from the aqueous solution, and a particle growth stage in which the transition metal hydroxide is grown under conditions in which the pH of the aqueous solution has been reduced from that in the nucleus production stage. In this case, the pH of the aqueous solution in the nucleus production stage is preferably from at least 12 to not more than 13. In addition, the pH of the aqueous solution in the particle growth stage is preferably from at least 11 to less than 12.

All of the herein disclosed lithium rechargeable batteries can, as has been described in the preceding, stably manifest a high output even in a low SOC region (for example, at an SOC of 30% or less), and as a consequence are suitable, for example, for application as a vehicle-mounted battery, for example, in an automobile (typically as a battery for service as a motive power source). The present invention can therefore provide a vehicle that is equipped with any of the herein disclosed lithium rechargeable batteries (this also includes a battery pack configuration in which a plurality of batteries are connected). The present invention in particular can provide a vehicle in which the subject lithium rechargeable battery is installed as a motive power source (for example, an electric vehicle (EV) or plug-in hybrid vehicle (PHV) that can be charged from a household power source).

DESCRIPTION OF EMBODIMENTS

Preferred embodiments of the present invention are described herebelow with reference to the figures. Each of the figures is a schematic representation and does not necessarily reflect an actual circumstance. Matters required for the execution of the present invention but not particularly described in this Description can be understood as design matters for the individual skilled in the art based on the conventional art in the pertinent field. The present invention can be implemented based on the contents disclosed in this Description and the common general technical knowledge in the pertinent field.

A positive electrode active material particle 10 (FIG. 1) used in the lithium rechargeable battery according to the present embodiment contains a lithium transition metal oxide having a layered rock salt structure with a crystal structure belonging to the hexagonal system and has a ratio (A/B) in its powder x-ray diffraction pattern taken with the CuKα line that satisfies the equation (A/B)≤0.7 where A is the full width at half maximum of the peak obtained for the diffraction plane with Miller indices of (003) plane and B is the full width at half maximum of the peak obtained for the diffraction plane with Miller indices of (104).

<The Powder X-Ray Diffraction Pattern>

The powder x-ray diffraction (XRD) measurement using the CuKα line may be carried out by irradiating x-rays (CuKα line) from an x-ray generating source onto the specimen plane of the specimen. The specimen plane may be a plane constituted of the positive electrode active material particles (typically a powder) 10 or may be a plane (surface of the positive electrode active material layer) formed of an actual positive electrode in which the positive electrode active material particles 10 are held with a binder. When this is done, exposure to the x-rays is carried out while varying the angle of incidence on the sample in a stepwise or continuous manner during a rotational scan of the sample on a prescribed rotational axis and the x-rays diffracted by the sample are captured by the measurement instrumentation. The angular difference between the diffraction direction of the x-rays and their direction of incidence (the diffraction angle 2θ) and the intensity of the diffracted x-rays are measured. These x-ray diffraction measurements can be carried out using commercial x-ray diffraction analyzers available from various instrument manufacturers. For example, a MultiFlex x-ray diffractometer from the Rigaku Corporation can be used.

Figure 2:
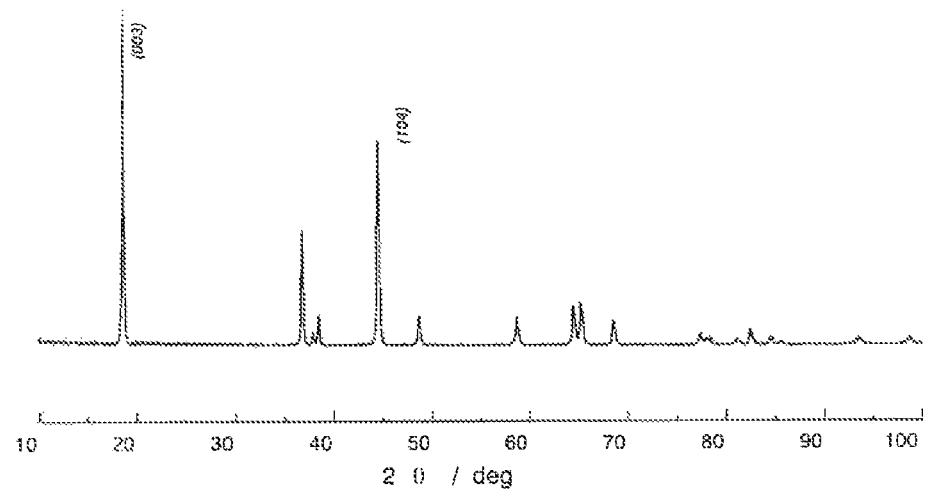
FIG. 2 is a diagram that illustrates an example of the powder x-ray diffraction pattern of a lithium transition metal oxide with a layered crystal structure.

FIG. 2 gives the x-ray diffraction pattern when the positive electrode active material particle 10 is $LiNi_{1/3}Co_{1/3}Mn_{1/3}O_2$. A diffraction peak originating with the (003) plane is produced at around a diffraction angle of 18° in the diffraction pattern for $LiNi_{1/3}Co_{1/3}Mn_{1/3}O_2$. A diffraction peak originating with the (104) plane is also produced at around a diffraction angle of 45°. The thusly obtained diffraction pattern may be used to calculate the full width at half maximum A for the diffraction peak originating with the (003) plane and the full width at half maximum B for the diffraction peak originating with the (104) plane. The full widths at half maximum A and B can be calculated using the analytical software provided with the commercially available x-ray diffraction measurement instrumentation from various measurement instrument manufacturers. For example, the JADE analytical software provided with x-ray diffractometers from the Rigaku Corporation can be used.

The positive electrode active material particle 10 provided by the present invention should exhibit a ratio (A/B) in this powder x-ray diffraction pattern—where A is the full width at half maximum of the diffraction peak obtained for the (003) plane and B is the full width at half maximum of the diffraction peak obtained for the (104) plane—of less than or equal to 0.7, while less than or equal to 0.65 is preferred and less than or equal to 0.6 is particularly preferred.

Considered relative to a conventional active material particle in which this full width at half maximum ratio (A/B) is greater than 0.7, the active material particle 10 having a full width at half maximum ratio (A/B) of less than or equal to 0.7 is thicker in the c axis direction of the crystal and is thinner in the direction orthogonal to the c axis. As a consequence, the plane that enables Li ion insertion is increased and the ion diffusion distance within the crystal is shortened. Li ion diffusion into the interior of the crystal is fast in an active material particle having such a structure, and as a consequence Li ion release from the interior of the crystal during charging is facilitated and Li ion intake into the interior of the crystal during discharge is facilitated. Accordingly, the output characteristics of the lithium rechargeable battery (particularly the output characteristics in the low SOC region) can be improved by the use of a positive electrode active material particle having such a full width at half maximum ratio (A/B).

<The Full Width at Half Maximum Ratio (A/B)>

The full width at half maximum ratio (A/B) for the herein disclosed positive electrode active material particle preferably satisfies 0.45≤(A/B)≤0.7, more preferably satisfies 0.45≤(A/B)≤0.65, and particularly preferably satisfies 0.45≤(A/B)≤0.6. On the other hand, an active material particle for which this full width at half maximum ratio (A/B) is less than 0.45 is disfavored because, in addition to being difficult to produce (synthesize), it exhibits an inadequate crystal growth (particularly growth in the direction perpendicular to the c axis) that creates the risk of elution of the metal in the active material into the electrolyte solution during high-temperature storage. This elution of metal into the electrolyte solution can cause a decline in the battery capacity. Viewed in terms of suppressing the deterioration in capacity during high-temperature storage, $0.45 \leq (A/B) \leq 0.7$ (particularly $0.5 \leq (A/B) \leq 0.7$) is preferably satisfied. For example, an active material particle with a full width at half maximum ratio (A/B) of from at least 0.5 to not more than 0.7 (particularly from at least 0.55 to not more than 0.65) is favorable from the standpoint of obtaining both improved output characteristics and a suppression of deterioration due to high-temperature storage.

The full width at half maximum ratio (A/B) can be adjusted using various methodologies. For example, the following methodologies, inter alia, can be used to reduce the full width at half maximum ratio (A/B): increasing the $Li/M_{all}$ for the starting material (the prefiring mixture containing a transition metal hydroxide and a lithium compound, infra) in the synthesis of the herein disclosed lithium transition metal oxide; lowering the firing temperature during this synthesis; shortening the firing time during this synthesis; and adding a small amount of tungsten (W) as a dopant element to this starting material. A single one of these methodologies or a suitable combination thereof may be used.

<The Hollow Structure>

Figure 1:
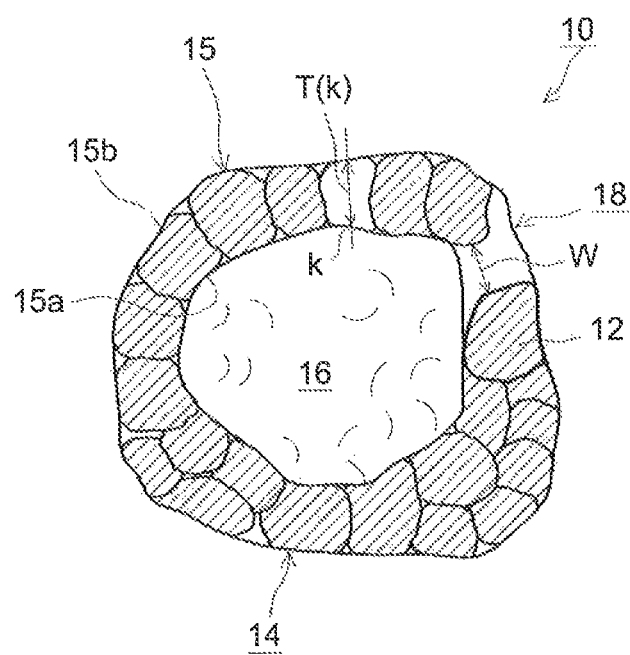
FIG. 1 is a cross-sectional diagram that schematically illustrates an active material particle used in an embodiment of the present invention.

As shown in FIG. 1, the positive electrode active material particle 10 is a perforated hollow active material particle that is a hollow structure having a secondary particle 14 and a hollow section 16 formed therewithin, and that has a through hole 18 that penetrates from the outside to the hollow section 16 in the secondary particle 14. The secondary particle 14 has a configuration in which primary particles 12 comprising the previously described crystals are aggregated into the shape of a spherical shell. In a preferred aspect, the active material particle 10 has a configuration, in the scanning electron microscopic (SEM) image of its cross section, in which the primary particles 12 lie in an annular shape (a string-of-beads shape).

This active material particle 10 may have a configuration in which the primary particles extend as a single row (a monolayer) or may have a configuration in which a stack of two or more primary particles extends in a row (extension as a multilayer). In The case where a stack of two or more primary particles extends in a row, the number of the primary particle 12 layers is preferably approximately not more than 5 (for example, 2 to 5) and is more preferably not more than 3 (for example, 2 or 3). The use of a configuration in which the primary particles 12 are extended in a substantially single layer row is particularly favorable.

This hollow active material particle (secondary particle) 10, in which the primary particles 12 extend in a monolayer or multilayer row, exhibits less aggregation by the primary particles 12 than does the compact structure lacking an internal cavity. As a consequence, there are fewer grain boundaries within the particle (and also a shorter diffusion distance for the Li ion) and diffusion of the Li ion into the particle interior is faster. Accordingly, when this low-grain-boundary hollow active material particle 10 is used, the output characteristics of the lithium rechargeable battery can be substantially improved (by a synergetic effect) in combination with the fast Li ion diffusion into the crystal interior due to the previously described specification of the full width at half maximum ratio (A/B). For example, a lithium rechargeable battery can be fabricated that exhibits an excellent output even in a low SOC region (for example, when the SOC is 30% or less) in which ion diffusion into the active material interior becomes rate-limiting.

According to investigations by the present inventors, it was confirmed in test examples, infra, that the use of an active material particle having a compact structure lacking an internal cavity does not provide the same level of effect with regard to improving the output in a low SOC region as is provided by setting the full width at half maximum ratio (A/B) in the herein disclosed preferred range. Accordingly, the use of the combination of an active material particle having a hollow structure and the previously described specification of the full width at half maximum ratio (A/B) can provide, through the synergistic effects due to this combination, a lithium rechargeable battery that has substantially improved output characteristics in the low SOC region (for example, at an SOC of 27%).

<The Average Thickness of the Shell Region>

The average thickness of the shell section 15 (the part constituted of the primary particles 12 aggregated into a spherical shell shape) that surrounds the hollow section 16 is in this case, for example, preferably not more than 2.2 µm and more preferably not more than 1.5 µm. A smaller thickness for the shell section 15 provides a shorter diffusion distance for the Li ion and faster diffusion of the Li ion into the interior of the shell section 15. This can yield a lower internal resistance (particularly with reference to the internal resistance in the low SOC region) as a result. There are no particular limitations on the lower limit for the average thickness of the shell section 15, but this lower limit is preferably about 0.1 µm or greater. The strength required of the positive electrode active material particle 10 is obtained by having the average thickness of the shell section 15 be at least 0.1 µm. The positive electrode active material particle 10 expands and contracts during the repetitive release and intake of the Li ion. A strength sufficient to withstand even this expansion and contraction can be secured. As a consequence, the durability of the positive electrode active material particle 10 can be improved and the properties of the lithium rechargeable battery can be timewise stabilized. Viewed in terms of obtaining both durability and the internal resistance lowering effect, the average thickness of the shell section 15 is preferably approximately 0.1 µm to 2.2 µm, more preferably 0.2 µm to 1.5 µm, and particularly preferably 0.5 µm to 1 µm.

The average thickness of the shell region can be acquired by SEM observation of a cross section of the positive electrode active material particle. For example, in the SEM image of a random cross section of the positive electrode active material particle, the thickness of the shell section 15 at a random location k on the inner side 15a of the shell section 15 is the shortest distance T(k) to the outer side 15b of the shell section 15 from the random location k on the inner side 15a of the shell section 15. To obtain the value of the average thickness of the shell section 15, for example, the indicated thickness is acquired for at least 10 random locations k on the inner side and the arithmetic average value is then calculated from these thicknesses.

<The Average Particle Diameter of the Primary Particles>

The preferred average thickness of the shell section 15 can also vary as a function of the average particle diameter of the primary particles 12. In general, the average thickness of the shell section 15 is preferably not more than 5 times—and more preferably is not more than approximately 4 times (for example, not more than approximately 2 times)—the average particle diameter of the primary particles 12. The average particle diameter of the primary particles that make up the herein disclosed positive electrode active material particle can be in the range from approximately 0.1 μm to 0.6 μm. Primary particles with an average particle diameter of approximately 0.2 μm to 0.5 μm are preferred. The previously described effects can be even more favorably manifested according to this mode because the average thickness of the shell section 15 is then very small. The average particle diameter of the primary particles can be acquired by a method known in the pertinent field, for example, by surface SEM measurements on the active material.

<The Average Particle Diameter of the Secondary Particles>

The average particle diameter of the positive electrode active material particles 10 (here and below, this refers to the median diameter (D50)) is preferably approximately 2 μm to 25 μm. A positive electrode active material particle 10 having this structure can exhibit an excellent battery performance in a more stable manner. For example, when the average particle diameter is too small, the hollow section 16 then has a small volume and the effect of improving the battery performance can assume a declining trend as a consequence. The average particle diameter is more preferably at least approximately 3 μm. Viewed from the standpoint, inter alia, of the productivity for the positive electrode active material particles, the average particle diameter is preferably not more than approximately 25 μm and is more preferably not more than approximately 15 μm (for example, not more than approximately 10 μm). The average particle diameter of the positive electrode active material particles is approximately 3 μm to 10 μm in a preferred mode. The average particle diameter of the positive electrode active material particles can be determined by a method known in the pertinent field, for example, by measurement based on a laser diffraction/scattering method.

<The Through Hole>

As shown in FIG. 1, the positive electrode active material particle 10 thus explained has in the secondary particle 14 (the shell section 15) a through hole 18 that penetrates from the outside to the hollow section 16. By traversing the through hole 18, the inward and outward movement of the electrolyte solution between the hollow section 16 and the outside is facilitated in this positive electrode active material particle 10 and a favorable exchange of the electrolyte solution in the hollow section 16 can then be obtained. As a consequence, this suppresses the appearance within the hollow section 16 of a solution shortage in which there is inadequate electrolyte solution. As a consequence, the primary particle 12 of the positive electrode active material can be more actively utilized in the interior of the hollow section 16. Such a structure—by combining the fast Li ion diffusion into the crystal interior due to the previously described specification of the full width at half maximum ratio (A/B), with the rapid permeation of the electrolyte solution to the primary particles 12 comprising such a crystal—enables (by a synergetic effect) an even greater improvement in the output characteristics of the rechargeable battery (particularly the output characteristics in the low SOC region).

Here, the aperture width W of the through hole 18 should be at least 0.01 μm on average for the average for the positive electrode active material layer. This aperture width for the through hole 18 is the diametric length at the narrowest part in the through hole 18 pathway running from the outside of the positive electrode active material particle 10 to the hollow section 16. The electrolyte solution 90 (refer to FIG. 3) can undergo a satisfactory input through the through hole 18 from the outside into the hollow section 16 when the aperture width of the through hole 18 is at least 0.01 μm on average. This can provide an even more favorable development of the improvement in the battery performance of the lithium rechargeable battery. When multiple through holes 18 are present, the evaluation should be carried out on the through hole that has the largest aperture width among the multiple through holes 18. The aperture width h of the through hole 18 is preferably not more than 2.0 μm on average, more preferably not more than 1.0 μm on average, and even more preferably not more than 0.5 μm on average.

The number of through holes 18 in the positive electrode active material particle 10 is preferably approximately 1 to 20 on average per particle and is more preferably approximately 1 to 5 on average per particle. A positive electrode active material particle 10 with this structure can provide a more stable manifestation of an excellent battery performance. To obtain the number of through holes 18 in the positive electrode active material particle 10 having this perforated hollow structure, for example, the number of through holes per particle is acquired for at least 10 randomly selected positive electrode active material particles and the arithmetic average value of these results is then determined.

<The Composition of the Lithium Transition Metal Oxide>

The lithium transition metal oxide constituting the herein disclosed positive electrode active material particle can be a lithium transition metal oxide having a layered crystal structure that is capable of the reversible insertion and release of lithium. The lithium transition metal oxide having a layered crystal structure can be exemplified by oxides that contain at least nickel as the transition metal (nickel-containing lithium complex oxides), oxides that contain at least cobalt as the transition metal, and oxides that contain at least manganese as the transition metal.

A favorable example of the lithium transition metal oxide having a layered crystal structure is a nickel-containing lithium complex oxide that contains at least nickel as a structural element. In addition to Li and Ni, this nickel-containing lithium complex oxide can contain one or two or more other metal elements (i.e., a transition metal element and/or a main group metal element in addition to the lithium and nickel). For example, this may be a nickel-containing lithium complex oxide that contains nickel, cobalt, and manganese as structural elements. A nickel-containing lithium complex oxide is preferred in which Ni is the main component among these transition metal elements or in which the Ni, Co, and Mn are present in approximately the same proportions.

In addition to these transition metal elements, one or two or more other elements may be incorporated as added structural elements (dopant elements). Any element belonging to Group 1 of the Periodic Table (alkali metals such as sodium), Group 2 (alkaline-earth metals such as magnesium and calcium), Group 4 (transition metals such as titanium and zirconium), Group 6 (transition metals such as chromium and tungsten), Group 8 (transition metals such as iron), Group 13 (the semimetal element boron and metals such as aluminum), and Group 17 (the halogens such as fluorine) may be incorporated as this added element. Typical examples are W, Zr, Mg, Ca, Na, Fe, Cr, Zn, Si, Sn, Al, B, and F. A compound that contains tungsten (W) as a dopant element is particularly preferred. The full width at half maximum ratio (A/B) can be readily controlled into the herein disclosed preferred range through the incorporation of W as a dopant element. These added structural elements can be added in a proportion of not more than 20 mol % and preferably not more than 10 mol % of the nickel, cobalt, and manganese structural transition metal elements.

The LiNiCoMnW oxide represented by the following general formula (1) is an example of a preferred composition for the layered-crystal-structured lithium transition metal oxide that constitutes the herein disclosed positive electrode active material particle.

$$Li_{1+x}Ni_yCo_zMn_{(1-y-z)}W_\alpha M_\beta O_2 \quad (1)$$

M in formula (1) can be one or two or more elements selected from the group consisting of Zr, Mg, Ca, Na, Fe, Cr, Zn, Si, Sn, Al, B, and F. x can be a real number that satisfies $0 \leq x \leq 0.2$. y can be a real number that satisfies $0.1 < y < 0.9$. z can be a real number that satisfies $0.1 < z < 0.4$. $\alpha$ is preferably a real number that satisfies $0.0005 \leq \alpha \leq 0.01$. In one preferred mode, $\alpha$ is a real number that satisfies $0.001 \leq \alpha \leq 0.01$. $\beta$ can be a real number that satisfies $0 \leq \beta \leq 0.01$. $\beta$ may be substantially 0 (i.e., M is substantially not present in the oxide). For the sake of convenience, the compositional ratio for O (oxygen) is given as 2 in the chemical formulas for the lithium transition metal oxide in this Description, but this is not critical and some variation in the composition is permissible (typically within the range from at least 1.95 to not more than 2.05).

<Methods of Producing the Lithium Transition Metal Oxide>

All of the herein disclosed hollow active material particles can be obtained, for example, by a method in which the transition metal hydroxide is precipitated under suitable conditions from an aqueous solution that contains at least one of the transition metal elements present in the lithium transition metal oxide that constitutes the active material particle (and preferably all of the non-lithium metal elements present in the oxide); this transition metal hydroxide is mixed with a lithium compound; and firing is carried out.

An example of the production of a hollow active material particle comprising a layered-crystal-structured LiNiCoMnW oxide is particularly described in the following as an embodiment of this method of producing the active material particle; however, this is not intended as a limitation of the application of this production method to hollow active material particles with this composition. For example, an active material particle that satisfies the prescribed range for the full width at half maximum ratio (A/B) can also be produced using the LiNiCoMn oxide to which W has not been added. In this case, the Li/M$_{all}$, firing temperature, and firing time that are described below may each be adjusted as appropriate so as to satisfy the prescribed range for the full width at half maximum ratio (A/B).

<The Starting Hydroxide Preparation Step>

The herein disclosed method of producing the active material particles includes a step (the starting hydroxide preparation step) of supplying the ammonium ion (NH$^+$) to an aqueous solution of a transition metal compound to precipitate particles of the transition metal hydroxide from the aqueous solution. The solvent (aqueous solvent) that is a constituent of this aqueous solution is typically water, but may be a mixed solvent in which water is the main component. The solvent other than water present in this mixed solvent is suitably an organic solvent (e.g., a lower alcohol) capable of uniformly mixing with water. The aqueous transition metal compound solution (also referred to below as the "transition metal solution") contains at least one (and preferably all) of the transition metal elements that constitute the lithium transition metal oxide (here, Ni, Co, Mn, and W), in accordance with the composition of the lithium transition metal oxide that constitutes the active material particle—a targeted product. For example, a transition metal solution is used that contains, in an aqueous solvent, one or two or more compounds capable of supplying the Ni ion, Co ion, Mn ion, and W ion. The corresponding metal sulfates, nitrates, chlorides, and so forth, can be used as appropriate as compounds that are metal ion sources for the Ni, Co, and Mn. For example, the use is preferred of a transition metal solution having a composition provided by dissolving nickel sulfate, cobalt sulfate, and manganese sulfate in an aqueous solvent (preferably water). For example, sodium tungstate is preferably used as a compound that is a metal ion source for W.

The NH$_4^+$ may be supplied to the transition metal solution, for example, in the form of an NH$_4^+$-containing aqueous solution (typically a water solution), or may be supplied by bubbling ammonia gas directly into the transition metal solution, or may be supplied using both of these methods. The NH$_4^+$-containing aqueous solution can be prepared, for example, by dissolving a compound that can function as an NH$_4^+$ source (ammonium hydroxide, ammonium sulfate, ammonia gas, and so forth) in an aqueous solvent. In the present embodiment, the NH$_4^+$ is supplied in the form of an aqueous ammonium hydroxide solution (i.e., aqueous ammonia).

This starting hydroxide preparation step may include a stage (the nucleus production stage) in which the transition metal hydroxide is precipitated from the transition metal solution at a pH of at least 12 (typically a pH from at least 12 to not more than 14, for example, a pH from at least 12.2 to not more than 13) and an NH$_4^+$ concentration of not more than 25 g/L (typically 3 to 25 g/L). This pH and NH$_4^+$ concentration can be adjusted by suitably balancing the amount of aqueous ammonia used with the amount of base (a compound that functions to shift the solution properties to the alkaline side) used. For example, sodium hydroxide, potassium hydroxide, and so forth can typically be used in the form of their aqueous solutions as this base. An aqueous sodium hydroxide solution is used in the present embodiment. In this Description, the pH value is the pH value at a solution temperature of 25° C.

The starting hydroxide preparation step may also include a stage (the particle growth stage) in which the transition metal hydroxide nuclei (typically in particulate form) that have been precipitated in the nucleus production stage are grown at a pH below 12 (typically a pH from at least 10 to less than 12 and preferably a pH from at least 10 to not more than 11.8, for example, a pH from at least 11 to not more than 11.8) and an NH$_4^+$ concentration of at least 1 g/L and preferably at least 3 g/L (typically 3 to 25 g/L). It is generally favorable to have the pH of the particle growth stage be at least 0.1 (generally at least 0.3 and preferably at least 0.5, for example, approximately 0.5 to 1.5) lower than the pH of the nucleus production stage.

The pH and NH$_4^+$ concentration here can be adjusted in the same manner as in the nucleus production stage. Carrying out this particle growth stage while satisfying the above-indicated pH and NH$_4^+$ concentration—and preferably having the NH$_4^+$ concentration at the above-indicated pH be in the range of not more than 15 g/L (for example, 1 to 15 g/L and ordinarily 3 to 15 g/L) and more preferably not more than 10 g/L (for example, 1 to 10 g/L and ordinarily 3 to 10 g/L)—can provide a fast precipitation rate for the transition metal hydroxide (a complex hydroxide containing Ni, Co, Mn, and W in the present case) and can produce a starting hydroxide particle well adapted for the formation of the herein disclosed perforated hollow active material particle (i.e., a starting hydroxide particle that readily forms a fired material having a perforated hollow structure). That is, through judicious adjustments of the ammonia concentration (ammonium ion concentration) and pH in the transition metal solution in the nucleus production stage and the particle growth stage, the precipitation rate for the transition metal hydroxide (here, NiCoMnW(OH)$_2$) in the particle growth stage is made faster in the herein disclosed art than the precipitation rate for the transition metal hydroxide (here, NiCoMnW(OH)$_2$) in the nucleus production stage. This causes the density of the region in the vicinity of the outer surface of the transition metal hydroxide particle that functions as a precursor to be higher than the density of the interior of the transition metal hydroxide particle.

The NH$_4^+$ concentration in the particle growth stage may be brought to 7 g/L or less (for example, 1 to 7 g/L and more preferably 3 to 7 g/L). The NH$_4^+$ concentration in the particle growth stage, for example, may be about the same as the NH$_4^+$ concentration in the nucleus production stage or may be lower than the NH$_4^+$ concentration in the nucleus production stage. The precipitation rate of the transition metal hydroxide can be acquired, for example, by checking the change in the total number of moles (the total ion concentration) of transition metal ions present in the liquid phase of the reaction mixture from the total number of moles of transition metal ions present in the transition metal solution supplied to the reaction mixture.

The temperature of the reaction mixture in both the nucleus production stage and the particle growth stage is preferably controlled to an approximately constant temperature (for example, the prescribed temperature ±1° C.) in the range approximately from 30° C. to 60° C. The temperature of the reaction mixture in the nucleus production stage may be approximately the same as the temperature of the reaction mixture in the particle growth stage. In addition, a nonoxidizing atmosphere is preferably maintained through the nucleus production stage and particle growth stage for the atmosphere for the reaction mixture and within the reactor. Moreover, the total number of moles of the Ni ion, Co ion, and Mn ion (the total ion concentration) present in the reaction mixture through the nucleus production stage and the particle growth stage can be, for example, approximately 0.5 to 2.5 mol/L and is preferably approximately 1.0 to 2.2 mol/L. The number of moles of the W ion (the ion concentration) present in the reaction mixture through the nucleus production stage and the particle growth stage can be, for example, approximately 0.01 to 1.0 mol/L. The transition metal solution is desirably replenished (typically by a continuous supply) in accordance with the precipitation rate of the transition metal hydroxide so as to maintain this ion concentration. The amounts of the Ni ion, Co ion, Mn ion, and W ion present in the reaction mixture are preferably brought to the quantitative ratio that corresponds to the composition of the target active material particle (i.e., the molar ratio among the Ni, Co, Mn, and W in the LiNiCoMnW oxide constituting this active material particle).

<The Amount of W Addition>

As previously indicated, the herein disclosed hollow active material particles (LiNiCoMnW oxide) contain primary particles that have a ratio (A/B) of not more than 0.7 where A is the full width at half maximum of the diffraction peak obtained for the (003) plane and B is the full width at half maximum of the diffraction peak obtained for the (104) plane in the powder x-ray diffraction pattern of the active material particles obtained using the CuKα line. In an example of a favorable condition for realizing this full width at half maximum ratio (A/B), production is carried out with the admixture of each metal ion source so as the tungsten content (amount added) is 0.05 mol % to 1 mol % where the total of all the non-tungsten transition metal elements (Ni, Co, and Mn in the present case) present in the transition metal hydroxide is 100 mol % as the mole percentage.

The W ion source is preferably mixed with the other metal ion sources so as to bring the tungsten content to 0.1 mol % to 1 mol % with reference to the total of all the other transition metal elements. Doing this makes it possible to appropriately inhibit growth in the firing step in the direction orthogonal to the c axis of the crystal, vide infra, and to thereby produce an active material particle in which the half width at full maximum ratio (A/B) satisfies the specified value.

On the other hand, a large addition whereby the tungsten content significantly exceeds 1 mol % is unfavorable because the tungsten then excessively segregates at the grain boundaries in the active material and an increase in the resistance is induced.

<The Mixing Step>

In the present embodiment, the thusly produced transition metal hydroxide particles (here, complex hydroxide particles that contain Ni, Co, Mn, and W) are separated from the reaction mixture, washed, and dried. A prefiring mixture is produced (the mixing step) by mixing these transition metal hydroxide particles with a lithium compound in the desired quantitative ratio. In this mixing step, typically the lithium compound is mixed with the transition metal hydroxide particles in the quantitative ratio that corresponds to the composition of the target active material particles (i.e., the molar ratio among the Li, Ni, Co, Mn, and W in the LiNiCoMnW oxide that constitutes these active material particles). A lithium compound capable, under the application of heat, of dissolving and converting to the oxide, for example, lithium carbonate, lithium hydroxide, and so forth, is preferably used as the lithium compound under consideration.

<The Li/M$_{all}$ Molar Ratio>

Another favorable condition for realizing the herein disclosed full width at half maximum ratio (A/B) is to prepare the transition metal hydroxide+lithium compound prefired mixture at a lithium excess whereby the molar ratio (Li/M$_{all}$) between the lithium (Li) and the sum (M$_{all}$) of all the other structural metal elements is in the range from 1.05 to 1.2. The transition metal hydroxide particles are preferably mixed with a relative excess of the lithium compound that provides 1.1≤Li/M$_{all}$≤1.2 for the molar ratio between the lithium (Li) and the sum (M$_{all}$) of all the other structural metal elements. Doing this makes it possible to suppress crystal growth during mixture firing in the direction orthogonal to the c axis and thus to obtain active material particles in which the full width at half maximum ratio (A/B) satisfies the prescribed value.

When, on the other hand, the lithium compound is mixed in such large amounts that the molar ratio (Li/M$_{all}$) between the Li and M$_{all}$ significantly exceeds 1.2, this is unfavorable because the excess lithium component (alkali component) that is not a constituent of the layered-crystal-structured LiNiCoMnW oxide remains present in the active material.

<The Firing Step>

After the lithium compound and transition metal hydroxide particles have been mixed so as to provide an Li/M$_{all}$ of at least 1.05, the active material particles are obtained by firing this mixture (the firing step). This firing step is desirably performed in air or in an atmosphere that is richer in oxygen than air. The firing temperature and firing time are important factors from the standpoint of realizing the prescribed value, supra, for the full width at half maximum ratio (A/B).

<The Firing Conditions>

The maximum firing temperature is preferably set into the range from at least 700° C. to not more than 1000° C. in an oxidizing atmosphere. By doing this, crystal growth in the direction orthogonal to the c axis during sintering can be suppressed and an active material particle having a full width at half maximum ratio (A/B)≤0.7 can then be produced. The maximum firing temperature is preferably at least 800° C. (preferably 850° C. to 1000° C., for example, 850° C. to 950° C.). The use of this range for the maximum firing temperature makes possible the production of an active material particle in which the full width at half maximum ratio (A/B) satisfies from at least 0.45 to not more than 0.7. In addition, the firing time (the firing time at the maximum firing temperature) may be approximately 3 hours to 20 hours (preferably 5 hours to 20 hours and particularly preferably 10 hours to 20 hours). Crystal growth during sintering is excessive when the firing time is too long, and as a result the full width at half maximum ratio (A/B) may end up exceeding 0.7. On the other hand, crystal growth during sintering is inadequate when the firing time is too short, and as a result the full width at half maximum ratio (A/B) may fall below 0.45.

A preferred embodiment is performed using a configuration that contains a first firing stage, in which the mixture is fired at a temperature T1 from at least 700° C. to not more than 900° C. (i.e., 700° C.≤T1≤900° C., for example, 700° C.≤T1≤800° C. and ordinarily 700° C.≤T1≤800° C.), and a second firing stage, in which the product that has traversed the first firing stage is fired at a temperature T2 from at least 800° C. to not more than 1000° C. (i.e., 800° C.≤T2≤1000° C., for example, 850° C.≤T2≤950° C.). Hollow active material particles in which the full width at half maximum ratio (A/B) assumes the prescribed value can be more efficiently formed by firing the mixture using such a multistage firing schedule. T1 and T2 are preferably configured to satisfy T1<T2.

The first firing stage and the second firing stage may be run consecutively (for example, after holding the mixture at the first firing temperature T1, the temperature may then be raised to the second firing temperature T2 and holding at the temperature T2 is performed), or, after holding at the first firing temperature T1, cooling may be carried out (for example, cooling to normal temperature) with pulverization and sieving as necessary and after this transport to the second firing stage.

In the herein disclosed art, the first firing stage may be understood as a stage in which firing is performed at a temperature T1 that is lower than in the second firing stage and that is a temperature region not exceeding the melting point and at which the sintering reaction of the target lithium transition metal oxide proceeds. The second firing stage may be understood as a stage in which firing is performed at a temperature T2 that is higher than in the first firing stage and that is a temperature region not exceeding the melting point and at which the sintering reaction of the target lithium transition metal oxide proceeds. The temperature difference between T1 and T2 is preferably set to at least 50° C. (typically at least 100° C., for example, at least 150° C.).

The active material particles can be obtained preferably by cooling the lithium transition metal oxide (LiNiCoMnW oxide) provided by the firing step followed by pulverization, for example, by milling, and a suitable classification. Here, the transition metal hydroxide particles that are the precursor for the positive electrode active material particles have a low interior density and a high density for the region in the vicinity of the outer surface. As a consequence, sintering proceeds in the firing step in such a manner that the low-density interior in the precursor transition metal hydroxide particle is incorporated into the high-density, mechanically strong region in the vicinity of the outer surface. This results in the formation of the hollow section 16 in association with the formation of the shell section 15 of the positive electrode active material particle 10. In addition, the through hole 18 that traverses the shell section 15 is formed in a portion of the shell section 15 during crystal growth during sintering. This results in the formation, as shown in FIG. 1, of a positive electrode active material particle 10 that has a shell section 15, a hollow section 16, and a through hole 18.

In a favorable embodiment of the positive electrode active material particle 10, the BET specific surface area of this active material particle 10 can be brought to approximately 0.5 m$^2$/g to 1.9 m$^2$/g. The BET specific surface area of the active material particle 10 is more preferably at least approximately 0.6 m$^2$/g and even more preferably at least approximately 0.8 m$^2$/g. In addition, the BET specific surface area of the active material particle 10, for example, is preferably not more than approximately 1.7 m$^2$/g and more preferably not more than 1.5 m$^2$/g.

This active material particle 10 is also harder than that provided by other production methods (for example, spray firing production methods (also known as spray drying production methods)), and an active material particle 10 having a high shape stability is thus obtained. For example, in a dynamic hardness measurement carried out at a loading rate of 0.5 mN/s to 3 mN/s using a flat diamond indenter with a diameter of 50 μm, the active material particle 10 has an average hardness of at least 0.5 MPa. Here, the average hardness refers to the value obtained by a dynamic hardness measurement carried out at a loading rate of 0.5 mN/s to 3 mN/s using a flat diamond indenter with a diameter of 50 μm. Such an active material particle having a hollow structure and a high average hardness (i.e., a high shape retention) can provide a battery that stably exhibits an even higher performance. This can contribute as a consequence to the fabrication of a lithium rechargeable battery, for example, that has a low internal resistance (i.e., excellent output characteristics) and that also exhibits little rise in resistance due to charge/discharge cycling (particularly charge/discharge cycling that includes high-rate discharge).

In particular, a nickel-containing transition metal solution is desirable for the production of the active material particle 10. When the transition metal solution contains nickel, a transition metal hydroxide particle is produced—during precipitation of the transition metal hydroxide in the nucleus production stage and the particle growth stage that takes the form of a secondary particle provided by the aggregation of a plurality of microfine primary particles. In addition, crystal growth proceeds in the firing temperature range while largely retaining the shape of the primary particles of this transition metal hydroxide. When lithium cobaltate (LiCoO$_2$) particles are produced by firing in the case of a transition metal solution that contains cobalt but is completely free of nickel, the particle as a whole ends up sintering without being able to maintain the shape of the primary particles. Obtaining an active material particle 10 having a hollow section 16 as described hereinabove (refer to FIG. 1) is problematic as a result.

As has been indicated in the preceding, a characteristic feature of the herein disclosed art is the use as the positive electrode active material of hollow active material particles for which the ratio (A/B) in the powder x-ray diffraction pattern taken using the CuKα line is not more than 0.7 where A is the full width at half maximum of the (003) diffraction plane peak and B is the full width at half maximum of the (104) diffraction plane peak. Accordingly, the lithium rechargeable battery can be fabricated using the same materials and processes as heretofore used, with the exception that the herein disclosed positive electrode active material particles are used.

For example, a carbon black such as acetylene black (AB) or Ketjen black or another particulate carbon material (e.g., graphite) may be mixed as an electroconductive material in the herein disclosed positive electrode active material particles. A binder, e.g., polyvinylidene fluoride (PVDF), styrene-butadiene rubber (SBR), polytetrafluoroethylene (PTFE), carboxymethyl cellulose (CMC), and so forth, may also be added in addition to the positive electrode active material and electroconductive material. A positive electrode active material layer-forming composition can be produced by dispersing the preceding in a suitable dispersing medium with mixing. A lithium rechargeable battery positive electrode can be fabricated preferably by coating a suitable amount of this composition on a positive electrode current collector comprising aluminum or an alloy in which aluminum is the main component, and pressing while drying.

Otherwise, the lithium rechargeable battery negative electrode that is the counterelectrode can be fabricated by the same methods as heretofore used. For example, the negative electrode active material should be a material that is capable of the insertion and release of the lithium ion. A typical example is a particulate carbon material of, e.g., graphite. In particular, graphite particles, due to their small particle diameter and large surface area per unit volume, can be a negative electrode active material favorable for a more rapid charge/discharge (for example, high-output discharge).

Just as for the positive electrode, a negative electrode active material layer-forming composition can be produced in paste form by dispersing this particulate material and a suitable binder in a suitable dispersing medium with mixing. A lithium rechargeable battery negative electrode can be fabricated preferably by coating a suitable amount of this composition on a negative electrode current collector comprising copper or nickel or an alloy thereof, and pressing while drying.

The same separators as heretofore used can be used in a lithium rechargeable battery that uses the herein disclosed lithium transition metal oxide for its positive electrode active material. For example, a porous sheet (porous film) comprising a polyolefin resin can be used.

The same nonaqueous electrolytes (typically an electrolyte solution) heretofore used in lithium rechargeable batteries can be used without particular limitation as the electrolyte. This typically is a composition provided by incorporating a supporting salt in a suitable nonaqueous solvent. A single selection or two or more selections from the group consisting of propylene carbonate (PC), ethylene carbonate (EC), diethyl carbonate (DEC), dimethyl carbonate (DMC), ethyl methyl carbonate (EMC), and so forth, can be used as the nonaqueous solvent. A single lithium compound (lithium salt) or two or more lithium compounds (lithium salts) selected from, for example, $LiPF_6$, $LiBF_4$, $LiClO_4$, $LiAsF_6$, $LiCF_3SO_3$, $LiC_4F_9SO_3$, $LiN(CF_3SO_2)_2$, $LiC(CF_3SO_2)_3$, LiI, and so forth, can be used as this supporting salt.

Insofar as a structure that uses the herein disclosed lithium transition metal oxide as a positive electrode active material is utilized, there are no particular limitations on the configuration (outer shape and size) of the lithium rechargeable battery that is fabricated. The outer packaging may be a thin sheet type constructed of, for example, a laminate film; the battery may have a battery outer case with a cylindrical or rectangular parallelepiped shape; or a small button shape may be used.

Embodiments of use of the herein disclosed positive electrode active material are described in the following using the example of a lithium rechargeable battery that is equipped with a wound electrode assembly; however, this should not be construed as limiting the structure of the present invention to this embodiment.

Figure 3:
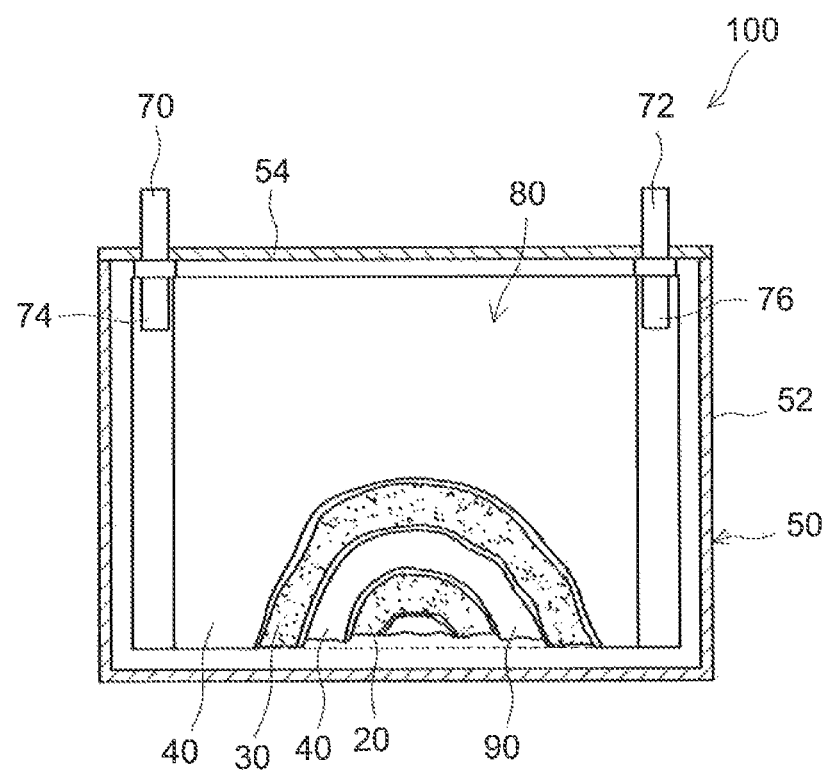
FIG. 3 is a diagram that schematically illustrates a lithium rechargeable battery according to an embodiment of the present invention.

As shown in FIG. 3, the lithium rechargeable battery 100 according to this embodiment has a structure in which an electrode assembly (a wound electrode assembly) 80 which itself has a configuration in which a long strip-shaped positive electrode sheet 30 and a long strip-shaped negative electrode sheet 20 are flat wound with a long strip-shaped separator 40 interposed therebetween—is housed, together with a nonaqueous electrolyte (not shown in figures), in a container 50 that has a shape (a flat box shape) capable of accommodating this wound electrode assembly 80.

The container 50 is provided with a flat, rectangular parallelepiped-shaped container main body 52 that is open at the top end, and with a lid 54 that closes this opening. A metal, e.g., aluminum, steel, and so forth, is preferably used as the material constituting the container 50 (aluminum is used in the present embodiment). Or, the container 50 may be made by molding a resin, e.g., polyphenylene sulfide resin (PPS), polyimide resin, and so forth. The upper surface (i.e., the lid 54) of the container 50 is provided with a positive electrode terminal 70, which is electrically connected to the positive electrode of the wound electrode assembly 80, and with a negative electrode terminal 72, which is electrically connected to the negative electrode 20 of this electrode assembly 80. The flat wound electrode assembly 80 is housed within the container 50 along with a nonaqueous electrolyte solution (not shown).

Figure 4:
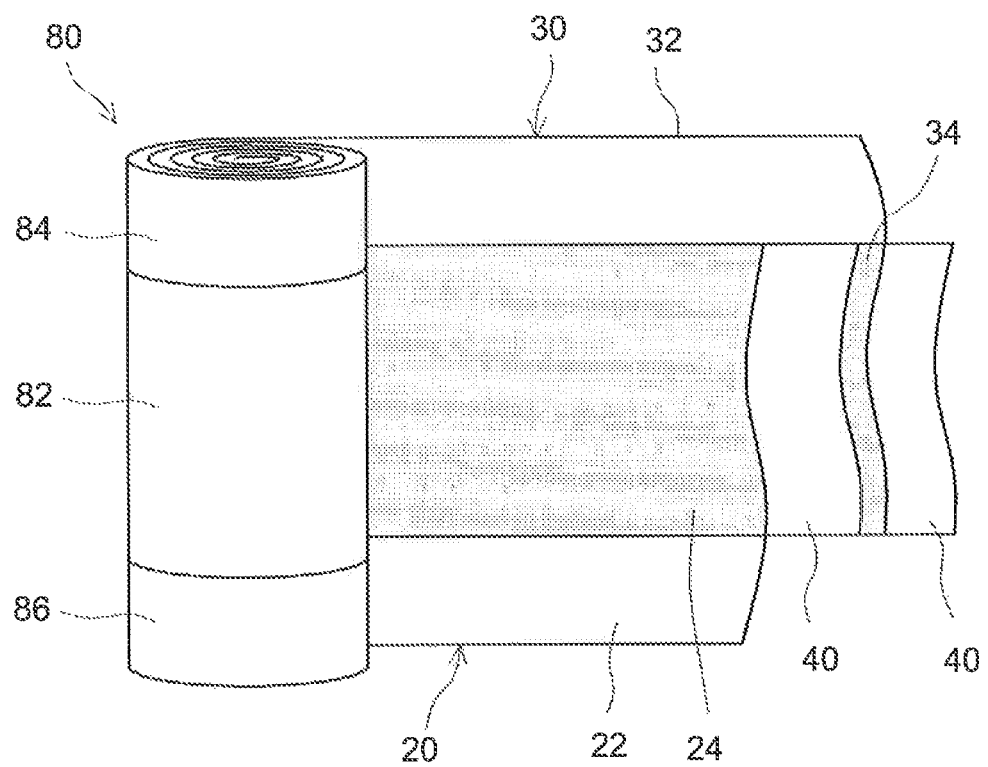
FIG. 4 is a diagram for describing a wound electrode assembly used in an embodiment of the present invention.

The materials and members as such that constitute the wound electrode assembly 80 with the structure described above may be the same, without particular limitation, as for the electrode assembly of a conventional lithium rechargeable battery, with the exception that a lithium transition metal oxide obtained by the method of the present embodiment is used as the positive electrode active material. The wound electrode assembly 80 according to the present embodiment has, as shown in FIG. 4, a long strip-shaped (ribbon-shaped) sheet structure in the stage prior to assembly.

The positive electrode sheet 30 has a structure in which a positive electrode active material layer 34 containing a positive electrode active material is supported on both sides of a long sheet-shaped positive electrode current collector 32 foil. However, the positive electrode active material layer 34 is not disposed at one edge, considered in the width direction, of the positive electrode sheet 30 (the upper edge region in FIG. 4), thereby forming a positive electrode active material layer-free region in which the positive electrode current collector 32 is exposed over a constant width. In the same manner as for the positive electrode sheet 30, the negative electrode sheet 20 also has a structure in which a negative electrode active material layer 24 containing a negative electrode active material is supported on both sides of a long sheet-shaped negative electrode current collector 22 foil. However, the negative electrode active material layer 24 is not disposed at one edge, considered in the width direction, of the negative electrode sheet 20 (the lower edge region in FIG. 4), thereby forming a negative electrode active material layer-free region in which the negative electrode current collector 22 is exposed over a constant width.

During the fabrication of the wound electrode assembly 80, the positive electrode sheet 30 is stacked with the negative electrode sheet 20 with the separator 40 interposed therebetween. When this is done, the positive electrode sheet 30 and the negative electrode sheet 20 are stacked shifted somewhat in the width direction so the positive electrode active material layer-free region on the positive electrode sheet 30 and the negative electrode active material layer-free region on the negative electrode sheet 20 protrude, respectively, from the two sides, considered in the width direction, of the separator 40. The flat wound electrode assembly 80 can be fabricated by winding the thusly stacked assembly and then flattening the resulting winding by pressing from the side direction.

A wound core region 82 (i.e., the region where the positive electrode active material layer 34 of the positive electrode sheet 30, the negative electrode active material layer 24 of the negative electrode sheet 20, and the separator 40 are densely wound) is formed in the center, considered in the direction of the winding axis, of the wound electrode assembly 80. In addition, the electrode active material layer-free regions on the positive electrode sheet 30 and the negative electrode sheet 20 respectively protrude to the outside from the wound core region 82 at the two ends, considered in the direction of the winding axis, of the wound electrode assembly 80. A positive electrode lead terminal 74 and a negative electrode lead terminal 76 are attached, respectively, to the protruding region (i.e., the region where the positive electrode active material layer 34 is not formed) 84 on the positive electrode side and the protruding region (i.e., the region where the negative electrode active material layer 24 is not formed) 86 on the negative electrode side, and are electrically connected, respectively, to the positive electrode terminal 70 and the negative electrode terminal 72.

The thusly structured wound electrode assembly 80 is introduced into the container main body 52 and a suitable nonaqueous electrolyte solution 90 is introduced (filled) into the container main body 52 and is permeated into the wound electrode assembly 80. The fabrication (assembly) of the lithium rechargeable battery 100 according to the present embodiment is completed by sealing the opening in the container main body 52 with the lid 54 by, for example, welding. The process of sealing the container main body 52 and the process of introducing (filling) the electrolyte solution can be carried out using the same methods that are employed in the fabrication of conventional lithium rechargeable batteries. This is followed by conditioning (initial charge/discharge) of the battery. As necessary, steps such as, for example, degassing, quality inspection, and so forth, can be performed.

In accordance with the Test Examples provided below, test lithium rechargeable batteries were fabricated using the herein disclosed positive electrode active material particles and the properties of these test lithium rechargeable batteries were evaluated.

Test Example 1

Production of Active Material Particles Having a Hollow Structure (Samples 1 to 16)

Deionized water was introduced into a reactor fitted with an overflow pipe and set to a 40° C. internal temperature; a nitrogen gas throughflow was established while stirring; and the interior of the reactor was adjusted to a nonoxidizing atmosphere having an oxygen gas (O2) concentration of 2.0% in combination with replacing the deionized water with nitrogen. Then, 25% aqueous sodium hydroxide solution and 25% aqueous ammonia were added so as to bring the pH, measured based on a solution temperature of 25° C., to 12.0 and the $NH_4^+$ concentration in the solution to 15 g/L.

A mixed aqueous solution W1 was prepared by dissolving nickel sulfate, cobalt sulfate, and manganese sulfate in water so as to provide an Ni:Co:Mn molar ratio of 0.33:0.33:0.33 and a total molar concentration of these metal elements of 1.8 mol/L. In addition, a mixed aqueous solution W2 was prepared by dissolving sodium tungstate in water so as to provide a molar concentration of the element tungsten of 0.05 mol/L. This mixed aqueous solution W1, mixed aqueous solution W2, a 25% aqueous NaOH solution, and 25% aqueous ammonia were fed at prescribed rates to the reactor in order to induce, while controlling the reaction mixture to a pH of 12.5 and an $NH_4^+$ concentration of 5 g/L, the crystallization of an NiCoMnW complex hydroxide (the nucleus production stage) from the reaction mixture. In sample 1, the tungsten content (amount of W addition) in the reaction mixture was adjusted to 0.5 mol % where the total of all the non-tungsten transition metal elements in the reaction mixture (Ni, Co, and Mn here) was 100 mol % as the mole percentage.

The supply of the 25% aqueous NaOH solution was stopped at 2 minutes and 30 seconds after the start of the feed of the mixed aqueous solutions. The feed of the mixed aqueous solutions and the 25% aqueous ammonia was continued at the prescribed rates. The feed of the 25% aqueous NaOH solution was resumed when the pH of the reaction mixture had fallen to 11.6. This process of feeding the mixed aqueous solutions, 25% aqueous NaOH solution, and 25% aqueous ammonia while controlling the reaction mixture to a pH of 11.6 and an $NH_4^+$ concentration of 5 g/L was continued for 4 hours in order to grow the NiCoMnW complex hydroxide particles (particle growth stage). This was followed by recovery of the product from the reactor, washing with water, and drying. Proceeding in this manner produced complex hydroxide particles having the composition given by $Ni_{0.33}Co_{0.33}Mn_{0.33}W_{0.005}(OH)_{2+\alpha}$, (here, the $\alpha$ in the formula is $0 \leq \alpha \leq 0.5$).

These complex hydroxide particles were subjected to a heat treatment in an air atmosphere for 12 hours at 150° C. The complex hydroxide particles were then mixed with $Li_2CO_3$ as the lithium source so as to provide a value of approximately 1.15 for the ratio (the $Li/M_{all}$ ratio) between the number of moles of the lithium (Li) and the total number of moles ($M_{all}$) for the Ni, Co, Mn, and W constituting the complex hydroxide. This mixture was fired for 4 hours at 760° C. and was then fired for 20 hours at 950° C. (maximum firing temperature). The fired product was subsequently pulverized and sieved. An active material particle sample having the composition given by $Li_{1.15}Ni_{0.33}Co_{0.33}Mn_{0.33}W_{0.005}O_2$ was obtained as a result.

The active material particle samples 1 to 16 given in Table 1 were produced by adjusting the amount of W addition condition and the maximum firing temperature condition in the active material particle sample production process described above, and more specifically by changing the amount of W addition from 0 mol % to 0.7 mol % and changing the maximum firing temperature from 750° C. to 1000° C. Surface SEM observations were carried out on the resulting active material particle samples. As a result, it was confirmed for all the active material particle samples that several through holes had been formed in a secondary particle provided by the aggregation of a plurality of primary particles.

The range of 0.38 to 1.12 was confirmed for samples 1 to 16 when the powder x-ray diffraction patterns of these active material particle samples were measured by the method described in the preceding and the ratios (A/B) were calculated where A is the full width at half maximum of the peak obtained for the diffraction plane with Miller indices of (003) and B is the full width at half maximum of the peak obtained for the diffraction plane with Miller indices of (104). The obtained active material particle samples were sieved to bring the average particle diameter (median diameter D50) to approximately 3 to 8 µm and to adjust the specific surface area into the range from approximately 0.5 to 1.9 $m^2/g$.

<Production of Active Material Particles Having a Solid Structure (Samples 17 to 21)>

Deionized water was introduced into a reactor fitted with an overflow pipe and set to a 40° C. internal temperature; a nitrogen gas throughflow was established while stirring; and the interior of the reactor was adjusted to a nonoxidizing atmosphere having an oxygen gas ($O_2$) concentration of 2.0% in combination with replacing the deionized water with nitrogen. Then, a 25% aqueous sodium hydroxide solution and 25% aqueous ammonia were added so as to bring the pH, measured based on a solution temperature of 25° C., to 12.0 and the $NH_4^+$ concentration in the solution to 15 g/L.

A mixed aqueous solution W1 was prepared by dissolving nickel sulfate, cobalt sulfate, and manganese sulfate in water so as to provide an Ni:Co:Mn molar ratio of 0.33:0.33:0.33 and a total molar concentration of these metal elements of 1.8 mol/L. In addition, a mixed aqueous solution W2 was prepared by dissolving sodium tungstate in water so as to provide a molar concentration of the element tungsten of 0.05 mol/L. This mixed aqueous solution W1, mixed aqueous solution W2, a 25% aqueous NaOH solution, and 25% aqueous ammonia were fed to the reactor at prescribed rates that provided an average residence time for the NiCoMnW complex hydroxide particles precipitated in the reactor of 10 hours, and a continuous crystallization was run while controlling the reaction mixture to a pH of 12.0 and an $NH_4^+$ concentration of 15 g/L. After the interior of the reactor had reached a steady state, the NiCoMnW complex hydroxide (the product) was continuously recovered through the overflow pipe and was washed with water and dried. Proceeding in this manner produced complex hydroxide particles having the composition given by $Ni_{0.33}Co_{0.33}Mn_{0.33}W_{0.005}(OH)_{2+\alpha}$ (here, the $\alpha$ in the formula is $0 \leq \alpha \leq 0.5$).

These complex hydroxide particles were subjected to a heat treatment in an air atmosphere for 12 hours at 150° C. The complex hydroxide particles were then mixed with $Li_2CO_3$ as the lithium source so as to provide a value of 1.15:1 for the ratio (Li:$M_{all}$) between the number of moles of the lithium (Li) and the total number of moles ($M_{all}$) for the Ni, Co, Mn, and W constituting the complex hydroxide. This mixture was fired for 4 hours at 760° C. and was then fired for 20 hours at 980° C. The fired product was subsequently pulverized and sieved. An active material particle sample having the composition given by $Li_{1.15}Ni_{0.33}Co_{0.33}Mn_{0.33}W_{0.005}O_2$ was obtained as a result.

The active material particle samples 17 to 21 given in Table 1 were produced by adjusting the amount of W addition condition and the maximum firing temperature condition in the active material particle sample production process described above. The appearance of these samples was checked by the previously indicated scanning electron microscopy. A compact structure was confirmed for all of the samples as a result. The range of 0.42 to 0.85 was confirmed when the powder x-ray diffraction pattern of these active material particle samples was measured by the method described above and the ratio (A/B) was calculated where A is the full width at half maximum of the peak obtained for the diffraction plane with Miller indices of (003) and B is the full width at half maximum of the peak obtained for the diffraction plane with Miller indices of (104).

Test lithium rechargeable batteries were fabricated using the active material particle samples of samples 1 to 21, and the properties of these test lithium rechargeable batteries were evaluated. Here, test lithium rechargeable battery samples were fabricated in which only the positive electrode active material particles were changed and the properties of these test lithium rechargeable battery samples were compared.

<The Positive Electrode Sheet>

The active material particle sample obtained as described above, AB (electroconductive material), and PVDF (binder) were mixed at a 90:8:2 mass ratio among these materials with N-methylpyrrolidone (NMP) to prepare a positive electrode active material layer-forming composition. This positive electrode active material layer-forming composition was coated in a strip configuration on both sides of a 15 µm-thick, long strip-shaped aluminum foil (the positive electrode current collector) and dried to produce a positive electrode sheet having a positive electrode active material layer disposed on both sides of the positive electrode current collector. The amount of application of the positive electrode active material layer composition was adjusted to provide approximately 11.8 $mg/cm^2$ (as the solids fraction) for both sides combined. After drying, pressing was performed to provide a density for the positive electrode active material layer of approximately 2.3 $g/cm^3$.

<The Negative Electrode Sheet>

Natural graphite powder as the negative electrode active material, SBR, and CMC were dispersed at a mass ratio among these materials of 98.6:0.7:0.7 in water to prepare a negative electrode active material layer-forming composition. This negative electrode active material layer-forming composition was coated on both sides of a 10 µm-thick, long strip-shaped copper foil (the negative electrode current collector) and dried to produce a negative electrode sheet having a negative electrode active material layer disposed on both sides of the negative electrode current collector. The amount of application of the negative electrode active material layer composition was adjusted to provide approximately 7.5 $mg/cm^2$ (as the solids fraction) for both sides combined. After drying, pressing was performed to provide a density for the negative electrode active material layer of approximately 1.0 $g/cm^3$ to 1.4 $g/cm^3$.

<The Lithium Rechargeable Battery>

The positive electrode sheet and the negative electrode sheet were stacked and wound with two sheets of a separator (a porous polyethylene separator with a monolayer structure was used) interposed therebetween, and the resulting winding was pressed flat from the side direction to produce a flat wound electrode assembly. This wound electrode assembly was introduced along with a nonaqueous electrolyte solution into a box-type battery container and the opening in the battery container was sealed airtight. The nonaqueous electrolyte solution used was prepared by incorporating $LiPF_6$ as a supporting salt at a concentration of approximately 1 mol/L in a mixed solvent that contained EC, EMC, and DMC at a volumetric ratio of 3:3:4. An electrolyte solution could also be optionally used in which the difluorophosphate salt ($LiPO_2F_2$) and/or lithium bisoxalate borate (LiBOB), either each individually or as their mixture, is dissolved in a proportion of approximately 0.05 mol/L. A lithium rechargeable battery was thusly assembled. This was followed by an initial charge/discharge treatment (conditioning) by an ordinary method to obtain the test lithium rechargeable battery. The opposing capacity ratio in the test battery, calculated from the charging capacity of the positive electrode and the charging capacity of the negative electrode, is controlled to 1.5 to 1.9.

<Measurement of the Rated Capacity (Initial Capacity)>

The test lithium rechargeable battery fabricated as described above was then submitted to measurement of the rated capacity at a temperature of 25° C. in the voltage range from 3.0 V to 4.1 V using the following procedures 1 to 3.

Procedure 1: constant current discharge at 1 C to 3.0 V, then constant voltage discharge for 2 hours, pause for 10 seconds.

Procedure 2: constant current charging at 1 C to 4.1 V, then constant voltage charging for 2.5 hours, pause for 10 seconds.

Procedure 3: constant current discharge at 0.5 C to 3.0 V, then constant voltage discharge for 2 hours, stop for 10 seconds.

The rated capacity (initial capacity) was taken to be the discharge capacity (CCCV discharge capacity) for the discharge in procedure 3 from the constant current discharge through the constant voltage discharge. The rated capacity of the test lithium rechargeable batteries was approximately 4 Ah.

<SOC Adjustment>

The SOC was adjusted for each of the test lithium rechargeable batteries using the following procedures 1 and 2. The SOC adjustment was performed in a 25° C. temperature environment in order to hold the influence of the temperature constant.

Procedure 1: Bring to a state of charge of approximately 60% of the rated capacity (60% SOC) by charging at a constant current of 1 C from 3 V. Here, "SOC" indicates "state of charge".

Procedure 2: After procedure 1, charge at constant voltage for 2.5 hours.

The test lithium rechargeable batteries could be adjusted to the prescribed state of charge by doing this.

<Output Characteristic at −30° C. and a 27% SOC>

The output characteristic of the individual test lithium rechargeable batteries was measured at −30° C. and a 27% SOC. The output characteristic was measured using the following procedures.

Procedure 1: In an environment at normal temperature (here, 25° C.), adjustment to a 27% SOC by constant current charging at 1 C from 3.0 V, then charging at constant voltage for 1 hour.

Procedure 2: The battery adjusted to a 27% SOC as above is held for 6 hours in a −30° C. thermostat.

Procedure 3: After procedure 2, constant watt (W) discharge is carried out from the 27% SOC in a −30° C. temperature environment. At this point, the number of seconds required after the start of the discharge for the voltage to reach 2.0 V is measured.

Procedure 4: Procedures 1 to 3 are repeated while changing the constant watt discharge voltage in procedure 3 for conditions of 80 W to 200 W. Here, procedures 1 to 3 are repeated while raising the constant watt discharge voltage for 10 W increments, i.e., the constant watt discharge voltage in procedure 3 for 80 W the first time, 90 W the second time, 100 W the third time, . . . , until the constant watt discharge voltage in procedure 3 reaches 200 W.

Procedure 5: The W at 2 seconds is calculated as the output characteristic from the approximation curve for the plot in which the number of seconds until 2.0 V measured for the constant watt condition in procedure 4 is plotted on the horizontal axis and W at this time is plotted on the vertical axis.

Figure 5:
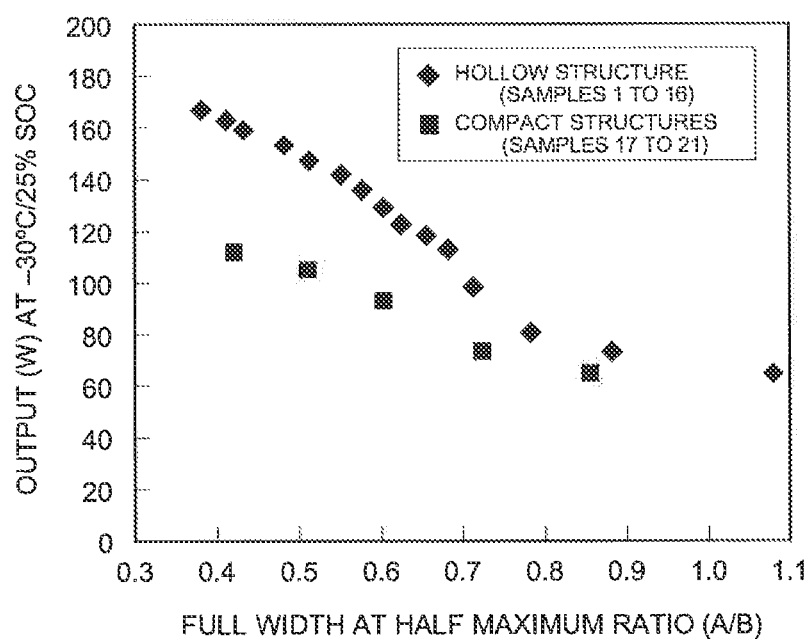
FIG. 5 is a graph that shows the relationship between the full width at half maximum ratio (A/B) and the output characteristic.

This output characteristic gives the output that can also be developed by the test lithium rechargeable battery when discharge is performed for a set time in a very low temperature environment, i.e., −30° C., at a low amount of charge of an SOC of about 27%. As a consequence, a higher value of W for this output characteristic indicates that a higher output is stably obtained even for a low SOC condition. The results are given in Table 1 and FIG. 5. FIG. 5 is a graph that shows the relationship between the half width at full maximum ratio (A/B) and the output characteristic (W).

TABLE 1

| | | (003)/(004) full width at half maximum ratio (A/B) | maximum firing temperature (° C.) | amount of tungsten addition (mol %) | output at −30° C. and a 27% SOC (W) | capacity ratio after storage at 60° C. (%) |
|---|---|---|---|---|---|---|
| hollow structure | sample 1 | 0.38 | 750 | 0.5 | 167 | 87.1 |
| | sample 2 | 0.41 | 810 | 0.3 | 163 | 88.9 |
| | sample 3 | 0.43 | 840 | 0.5 | 159 | 89.5 |
| | sample 4 | 0.48 | 860 | 0.5 | 154 | 90.1 |
| | sample 5 | 0.51 | 900 | 0.7 | 148 | 90.2 |
| | sample 6 | 0.55 | 890 | 0.5 | 142 | 90.3 |
| | sample 7 | 0.57 | 900 | 0.5 | 136 | 90.1 |
| | sample 8 | 0.60 | 930 | 0.3 | 129 | 90.2 |
| | sample 9 | 0.62 | 950 | 0.5 | 122 | 90.2 |
| | sample 10 | 0.65 | 950 | 0.3 | 119 | 90.3 |
| | sample 11 | 0.68 | 930 | 0.1 | 113 | 90.2 |
| | sample 12 | 0.71 | 990 | 0.5 | 99 | 90.1 |
| | sample 13 | 0.78 | 970 | 0.2 | 81 | 89.9 |
| | sample 14 | 0.88 | 930 | 0 | 73 | 87.3 |
| | sample 15 | 1.08 | 950 | 0 | 65 | 81.2 |
| | sample 16 | 1.12 | 1000 | 0 | 62 | 75.1 |

TABLE 1-continued

|  |  | (003)/(004) full width at half maximum ratio (A/B) | maximum firing temperature (° C.) | amount of tungsten addition (mol %) | output at −30° C. and a 27% SOC (W) | capacity ratio after storage at 60° C. (%) |
|---|---|---|---|---|---|---|
| compact | sample 17 | 0.42 | 800 | 0.5 | 112 | 88.9 |
| structure | sample 18 | 0.51 | 880 | 0.3 | 105 | 89.7 |
|  | sample 19 | 0.60 | 930 | 0.5 | 93 | 89.8 |
|  | sample 20 | 0.72 | 980 | 0.5 | 73 | 88.9 |
|  | sample 21 | 0.85 | 910 | 0 | 65 | 83.8 |

As shown in Table 1 and FIG. 5, the output characteristic improved as the full width at half maximum ratio (A/B) declined when a hollow section was present in the active material particle and also when the hollow section was absent. However, the rate of increase (slope) relative to the change in the full width at half maximum ratio (A/B) was larger when the hollow section was present in the active material particle than when the hollow section was absent. In particular, at a full width at half maximum ratio (A/B) in the region less than or equal to 0.7, a very high output value, of at least 110 W, was obtained due to the disposition of the hollow section in the active material particle and an even better output performance was obtained (samples 1 to 11). It was thereby confirmed that the improvement in the output in the low SOC region brought about by having the full width at half maximum ratio (A/B) be in the herein disclosed preferred range is particularly effectively manifested when active material particles (secondary particles) are used that have a hollow structure in which a cavity is present in the interior. Viewed in terms of improving the output characteristic in the low SOC region, it is favorable to dispose a hollow section in the active material particle and to have the full width at half maximum ratio (A/B) be not more than 0.7, while not more than 0.6 is preferred (samples 1 to 8), not more than 0.5 is more preferred (samples 1 to 4), and not more than 0.4 is particularly preferred (sample 1).

<High-Temperature Storage Durability>

Figure 6:
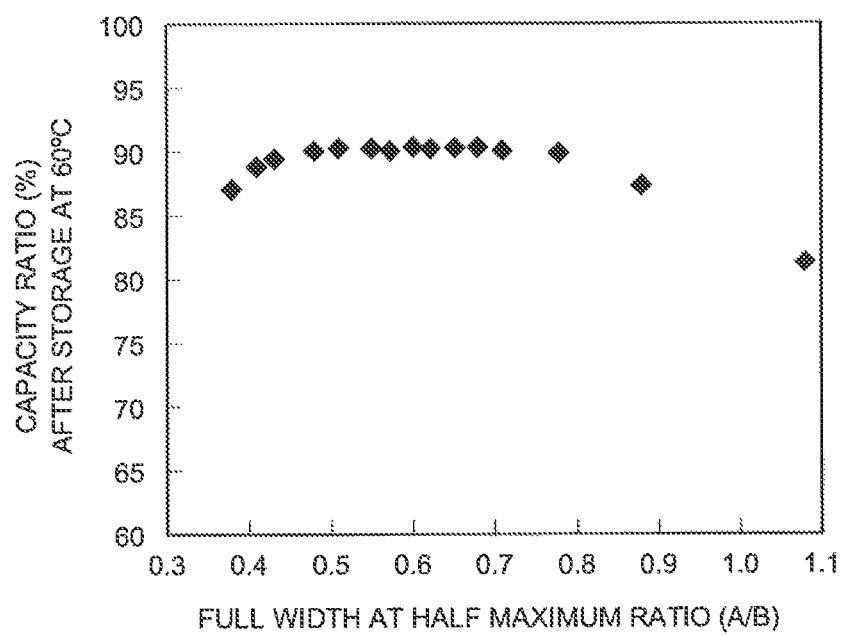
FIG. 6 is a graph that shows the relationship between the full width at half maximum ratio (A/B) and the capacity ratio after high-temperature storage.

The capacity ratio after storage at 60° C. at a state of charge of 80% SOC was measured for each of the test lithium rechargeable batteries. This measurement was performed using the following procedures.
Procedure 1: Operating in a normal temperature environment (here, 25° C.), adjustment to an 80% SOC was performed by constant current charging at 1 C followed by charging at constant voltage for 2.5 hours.
Procedure 2: The battery thusly adjusted to an 80% SOC was introduced into a 60° C. thermostat and was stored for 60 days.
Procedure 3: After procedure 2, the capacity was measured using the same procedures as in "Measurement of the rated capacity (initial capacity)", supra, and this was taken to be the capacity after storage at 60° C. In addition, the capacity ratio (%) after storage at 60° C. was calculated using the following formula: [(capacity after storage at 60° C./initial capacity)×100]. The results are given in Table 1 and FIG. 6. FIG. 6 is a graph of the relationship, for the batteries that used the hollow-structured active material particles of samples 1 to 16, between the full width at half maximum ratio (A/B) and the capacity ratio (%) after storage at 60° C.

As is shown in Table 1 and FIG. 6, the batteries that used the active material particles of samples 4 to 12, which had a full width at half maximum ratio (A/B) of 0.48 to 0.71, in all instances had an excellent capacity ratio, of at least 90%, in the high-temperature storage test in which storage was performed for 60 days at 60° C., and thus all exhibited a very high durability. On the other hand, the batteries that used the active material particles of samples 1 to 3, for which the full width at half maximum ratio (A/B) was not more than 0.43, had a capacity ratio in this high-temperature storage test of less than 90% and thus had an impaired durability. In addition, all of the batteries for samples 13 to 16, for which the full width at half maximum ratio (A/B) was at least 0.78, had a capacity ratio less than 90%. Based on this, and considered in terms of improving the high-temperature storage durability, the full width at half maximum ratio (A/B) is favorably 0.45 to 0.75 (samples 4 to 12) and is preferably 0.5 to 0.70 (samples 5 to 11). Considered in terms of satisfying both the output characteristic and the high-temperature storage durability, the full width at half maximum ratio (A/B) is favorably 0.45 to 0.7 (samples 4 to 11) and is preferably 0.45 to 0.60 (samples 4 to 8).

The following tests were run in order to elucidate the influence on the full width at half maximum ratio (A/B) exercised by the production conditions (maximum firing temperature, firing time, amount of W addition, $Li/M_{all}$ ratio) during production of the hollow-structured active material particles.

Test Example 2

Figure 7:
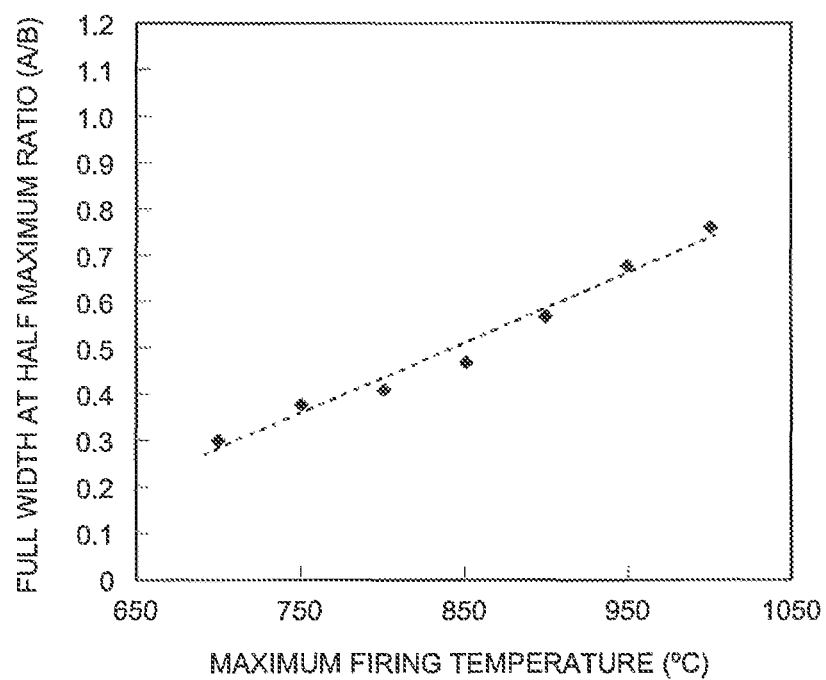
FIG. 7 is a graph that shows the relationship between the maximum firing temperature and the full width at half maximum ratio (A/B)

In this example, the active material particles were produced using different maximum firing temperatures between 700° C. and 1000° C. in the above-described process for producing the hollow-structured active material particles of samples 1 to 16. The firing time was held constant at 20 hours; the amount of W addition was held constant at 0.5 mol %; and the $Li/M_{all}$ ratio was held constant at 1.15. The powder x-ray diffraction patterns of the obtained active material particle samples were measured by the method described in the preceding, and the ratios (A/B) were calculated where A is the full width at half maximum of the peak obtained for the diffraction plane with Miller indices of (003) and B is the full width at half maximum of the peak obtained for the diffraction plane with Miller indices of (104). The results are given in FIG. 7. FIG. 7 is a graph that shows the relationship between the maximum firing temperature and the full width at half maximum ratio (A/B).

As is clear from FIG. 7, the full width at half maximum ratio (A/B) exhibited a declining trend as the maximum firing temperature declined. For the active material particle samples tested here, the maximum firing temperature is preferably made 850° C. to 950° C. in order to bring the full width at half maximum ratio (A/B) to 0.45 to 0.7.

Test Example 3

Figure 8:
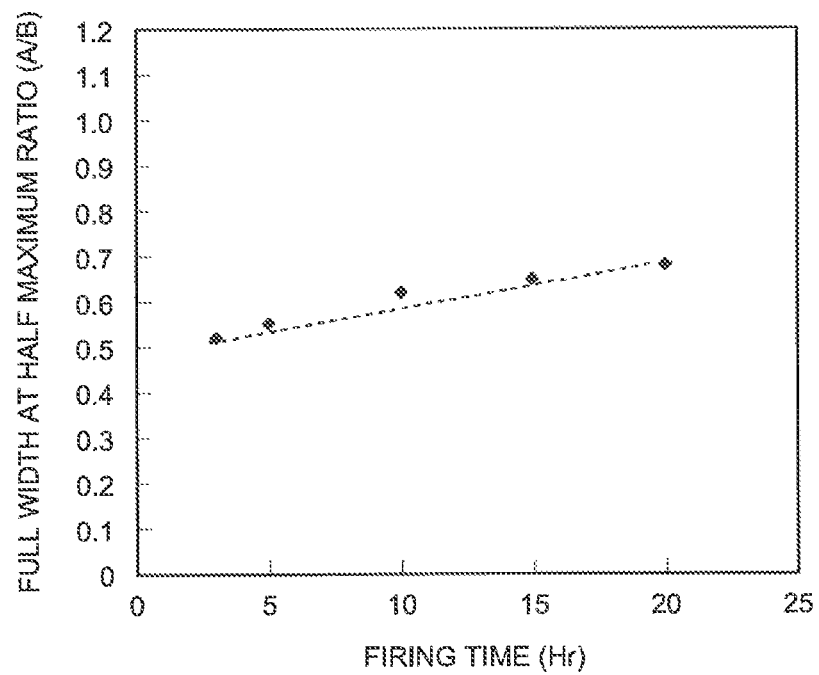
FIG. 8 is a graph that shows the relationship between the firing time and the full width at half maximum ratio (A/B)

In this example, the active material particles were produced using different firing times (the firing time at the maximum firing temperature) between 3 and 20 hours in the above-described process for producing the hollow-structured active material particles of samples 1 to 16. The maximum firing temperature was held constant at 950° C.; the amount of W addition was held constant at 0.5 mol %; and the Li/M$_{all}$ ratio was held constant at 1.15. The powder x-ray diffraction patterns of the obtained active material particle samples were measured by the method described in the preceding, and the ratios (A/B) were calculated where A is the full width at half maximum of the peak obtained for the diffraction plane with Miller indices of (003) and B is the full width at half maximum of the peak obtained for the diffraction plane with Miller indices of (104). The results are given in FIG. 8. FIG. 8 is a graph that shows the relationship between the firing time and the full width at half maximum ratio (A/B).

As is clear from FIG. 8, the full width at half maximum ratio (A/B) exhibited a declining trend as the firing time declined. For the active material particle samples tested here, the firing time is preferably made not more than 20 hours in order to bring the full width at half maximum ratio (A/B) to 0.45 to 0.7.

Test Example 4

Figure 9:
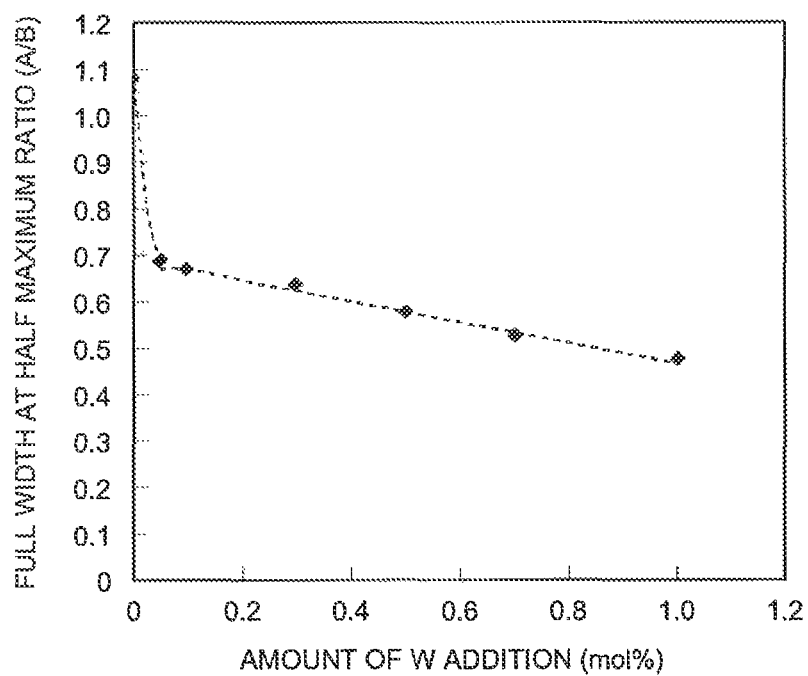
FIG. 9 is a graph that shows the relationship between the amount of W addition and the full width at half maximum ratio (A/B)

In this example, the active material particles were produced using different amounts of W addition between 0 and 1 mol % in the above-described process for producing the hollow-structured active material particles of samples 1 to 16. The maximum firing temperature was held constant at 950° C.; the firing time was held constant at 20 hours; and the Li/M$_{all}$ ratio was held constant at 1.15. The powder x-ray diffraction patterns of the obtained active material particle samples were measured by the method described in the preceding, and the ratios (A/B) were calculated where A is the full width at half maximum of the peak obtained for the diffraction plane with Miller indices of (003) and B is the full width at half maximum of the peak obtained for the diffraction plane with Miller indices of (104). The results are given in FIG. 9. FIG. 9 is a graph that shows the relationship between the amount of W addition and the full width at half maximum ratio (A/B).

As is clear from FIG. 9, the full width at half maximum ratio (A/B) was confirmed to be substantially reduced by the addition of W. The full width at half maximum ratio (A/B) tended to gradually decrease in proportion to a gradual increase in the addition of W. For the active material particle samples tested here, the amount of W addition is preferably brought to from 0.05 mol % to 1 mol % in order to bring the full width at half maximum ratio (A/B) to 0.45 to 0.7.

Test Example 5

Figure 10:
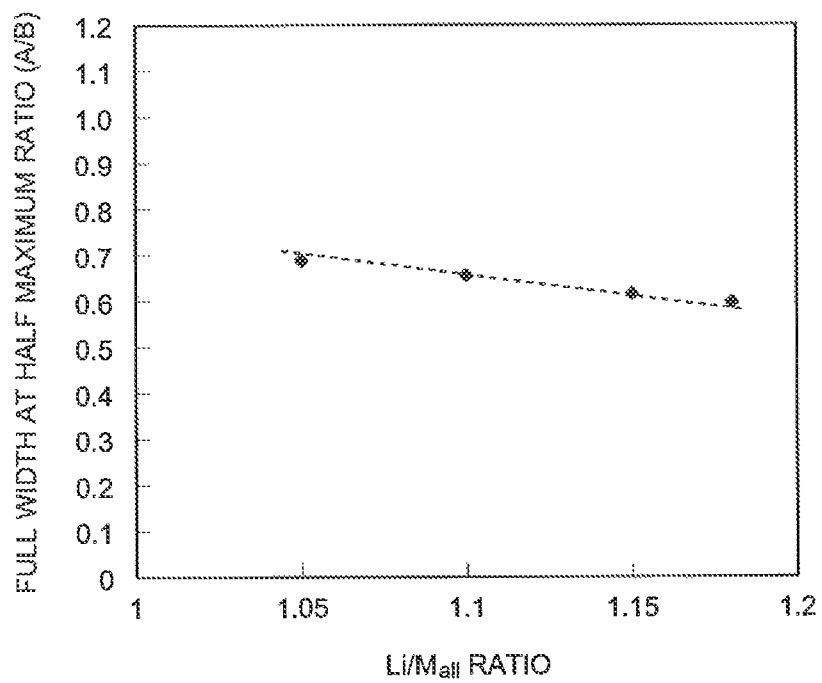
FIG. 10 is a graph that shows the relationship between the Li/$M_{all}$ ratio and the full width at half maximum ratio (A/B)

In this example, the active material particles were produced using different Li/M$_{all}$ ratios between 1.05 and 1.1 in the above-described process for producing the hollow-structured active material particles of samples 1 to 16. The maximum firing temperature was held constant at 950° C.; the firing time was held constant at 20 hours; and the amount of W addition was held constant at 0.5 mol %. The powder x-ray diffraction patterns of the obtained active material particle samples were measured by the method described in the preceding, and the ratios (A/B) were calculated where A is the full width at half maximum of the peak obtained for the diffraction plane with Miller indices of (003) and B is the full width at half maximum of the peak obtained for the diffraction plane with Miller indices of (104). The results are given in FIG. 10. FIG. 10 is a graph that shows the relationship between the Li/M$_{all}$ ratio and the full width at half maximum ratio (A/B).

As is clear from FIG. 10, the full width at half maximum ratio (A/B) exhibited a declining trend as the Li/M$_{all}$ ratio increased. For the active material particle samples tested here, the Li/M$_{all}$ ratio is preferably brought to at least 1.05 in order to bring the full width at half maximum ratio (A/B) to 0.45 to 0.7.

The present invention has been described in detail in the preceding, but the embodiments described in the preceding are only examples and the herein disclosed invention encompasses various modifications and alterations to the specific examples described hereinabove.

Figure 11:
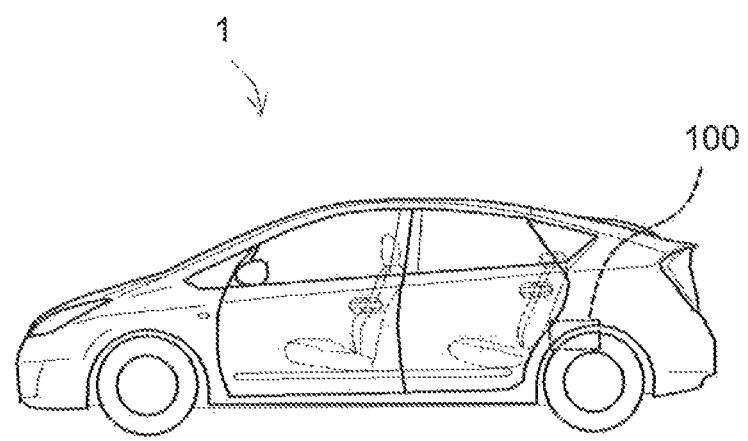
FIG. 11 is a drawing in side view that schematically illustrates a vehicle equipped with a lithium rechargeable battery.

The lithium rechargeable battery provided by the herein disclosed art, because it exhibits the excellent properties as described in the preceding, can be used as a lithium rechargeable battery for a variety of applications. For example, it can be favorably used as a power source for a motor (electric motor) mounted in a vehicle, for example, an automobile. This lithium rechargeable battery may be used in the form of a battery pack in which a plurality of the lithium rechargeable batteries are connected in series and/or parallel. Accordingly, the herein disclosed art can also provide a vehicle (typically an automobile and particularly an automobile that has an electric motor, such as a hybrid automobile, an electric automobile, or a fuel cell automobile) 1, as schematically illustrated in FIG. 11, that is equipped with this lithium rechargeable battery (possibly in the form of a battery pack) 100 as a power source.

INDUSTRIAL APPLICABILITY

The present invention can provide a lithium rechargeable battery that can stably exhibit a high output even in low SOC regions.

The invention claimed is:
1. A lithium rechargeable battery comprising:
a current collector; and
an active material layer that contains active material particles that are retained on the current collector, wherein
the active material particles are secondary particles formed by the aggregation of a plurality of primary particles of a lithium transition metal oxide and have a hollow structure having a hollow section formed within the secondary particle and a shell section that surrounds the hollow section,
a through hole that penetrates from the outside to the hollow section is formed in the secondary particle,
the lithium transition metal oxide is a compound with a layered crystal structure, and
the ratio (A/B) in the powder x-ray diffraction pattern of the active material particles, where A is the full width at half maximum of the diffraction peak obtained for the (003) plane and B is the full width at half maximum of the diffraction peak obtained for the (104) plane, satisfies the equation (A/B)≤0.65.

2. The lithium rechargeable battery according to claim 1, wherein the ratio of the full widths at half maximum (A/B) satisfies the equation 0.45≤(A/B)≤0.65.

3. The lithium rechargeable battery according to claim 1, wherein the average thickness, in the active material particle, of the shell section that surrounds the hollow section is 0.1 μm to 2.2 μm.

4. The lithium rechargeable battery according to claim 1, wherein the lithium transition metal oxide contains at least nickel as a structural element.

5. The lithium rechargeable battery according to claim 1, wherein
the lithium transition metal oxide contains tungsten, and
the content of this tungsten is 0.05 mol % to 1 mol % where the total of all the non-tungsten transition metal elements in the compound is 100 mol % as the mole percentage.

6. The lithium rechargeable battery according to claim 1, wherein the lithium transition metal oxide is represented by the following general formula:

$$Li_{1+x}Ni_yCo_zMn_{(1-y-z)}W_\alpha M_\beta O_2 \quad (1)$$

wherein in formula (1), x, y, z, $\alpha$, and $\beta$ are real numbers that satisfy all of the following:
0≤x≤0.2,
0.1<y<0.9,
0.1<z<0.4,
0.0005≤$\alpha$≤0.01, and
0≤$\beta$≤0.01, and M is either not present or is one or two or more elements selected from the group consisting of Zr, Mg, Ca, Na, Fe, Cr, Zn, Si, Sn, Al, B, and F.

7. The lithium rechargeable battery according to claim 1, wherein the active material particles are active material particles produced by a production method comprising:
a step of preparing a starting hydroxide by supplying an ammonium ion to an aqueous solution of a transition metal compound to precipitate particles of a transition metal hydroxide from the aqueous solution, with this aqueous solution containing at least one transition metal element that is a constituent of the lithium transition metal oxide;
a mixing step of preparing a prefiring mixture by mixing the transition metal hydroxide with a lithium compound; and
a firing step of firing the mixture to obtain the active material particles.

8. The lithium rechargeable battery according to claim 1, wherein the ratio of the full widths at half maximum (A/B) satisfies the equation (A/B)≤0.48.

* * * * *